(12) United States Patent
Stefanatos et al.

(10) Patent No.: US 12,407,447 B2
(45) Date of Patent: Sep. 2, 2025

(54) UNLICENSED-LICENSED CROSS-CARRIER RETRANSMISSION

(71) Applicant: QUALCOMM Incorporated, San Diego, CA (US)

(72) Inventors: Stelios Stefanatos, San Diego, CA (US); Junyi Li, Fairless Hills, PA (US); Qing Li, Princeton Junction, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 17/820,709

(22) Filed: Aug. 18, 2022

(65) Prior Publication Data
US 2023/0053730 A1 Feb. 23, 2023

(30) Foreign Application Priority Data
Aug. 19, 2021 (GR) .............................. 20210100561

(51) Int. Cl.
*H04L 1/08* (2006.01)
*H04W 28/02* (2009.01)
*H04W 28/26* (2009.01)
*H04W 72/0453* (2023.01)
*H04W 72/20* (2023.01)

(52) U.S. Cl.
CPC ........... *H04L 1/08* (2013.01); *H04W 28/0284* (2013.01); *H04W 28/26* (2013.01); *H04W 72/0453* (2013.01); *H04W 72/20* (2023.01)

(58) Field of Classification Search
CPC . H04L 1/08; H04L 1/04; H04L 1/1887; H04L 1/1896; H04W 28/0284; H04W 28/26; H04W 72/0453; H04W 72/20
See application file for complete search history.

(56) References Cited

U.S. PATENT DOCUMENTS

| | | | |
|---|---|---|---|
| 2015/0327275 A1* | 11/2015 | Kwon | H04L 5/001 370/236 |
| 2016/0050667 A1* | 2/2016 | Papasakellariou | H04L 1/1887 370/329 |
| 2016/0360422 A1* | 12/2016 | Zhang | H04W 16/14 |
| 2017/0105207 A1* | 4/2017 | Fan | H04W 72/23 |
| 2017/0126365 A1* | 5/2017 | Peng | H04L 1/1822 |
| 2019/0059057 A1* | 2/2019 | Peng | H04W 52/146 |
| 2019/0098661 A1* | 3/2019 | Ye | H04W 74/06 |
| 2020/0229171 A1* | 7/2020 | Khoryaev | H04W 4/40 |
| 2022/0240316 A1* | 7/2022 | Dudda | H04W 72/0453 |
| 2023/0138096 A1* | 5/2023 | Zhao | H04W 72/40 370/329 |

* cited by examiner

Primary Examiner — Khaled M Kassim
Assistant Examiner — Ahmed K Jaber
(74) Attorney, Agent, or Firm — Harrity & Harrity, LLP

(57) ABSTRACT

Various aspects of the present disclosure generally relate to wireless communication. In some aspects, an apparatus of a user equipment (UE) may transmit, over an unlicensed carrier, an initial transmission of a transport block (TB) satisfying a condition and an indication that a retransmission of the TB will be communicated over a licensed carrier. The apparatus may retransmit the TB over the licensed carrier based at least in part on a failure of the transmission of the TB over the unlicensed carrier. Numerous other aspects are described.

27 Claims, 14 Drawing Sheets

UNLICENSED-LICENSED CROSS-CARRIER RETRANSMISSION

CROSS-REFERENCE TO RELATED APPLICATION

This Patent application claims priority to Greek Patent Application No. 20210100561, filed on Aug. 19, 2021, titled "UNLICENSED-LICENSED CROSS-CARRIER RETRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for unlicensed-licensed cross-carrier retransmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include transmitting, over an unlicensed carrier and in an initial transmission of a transport block (TB) satisfying a condition, an indication that a retransmission of the TB will be communicated over a licensed carrier. The method may include retransmitting the TB over the licensed carrier when the transmission of the TB over the unlicensed carrier is unsuccessful.

Some aspects described herein relate to a method of wireless communication performed by an apparatus of a UE. The method may include transmitting, over an unlicensed carrier and in an initial transmission of a TB satisfying a condition, an indication that a retransmission of the TB will be according to a scheme, where the scheme indicates that a first quantity of retransmissions of the TB will be communicated over the unlicensed carrier and that one or more retransmissions of the TB occurring after the first quantity of retransmissions of the TB will be communicated over a licensed carrier. The method may include retransmitting the TB over the unlicensed carrier and the licensed carrier according to the scheme when the transmission of the TB over the unlicensed carrier is unsuccessful.

Some aspects described herein relate to a method of wireless communication performed by an apparatus of a UE. The method may include receiving, over an unlicensed carrier, a TB satisfying a condition and an indication that a retransmission of the TB will be communicated over a licensed carrier. The method may include receiving the TB over the licensed carrier when the transmission of the TB over the unlicensed carrier is unsuccessful.

Some aspects described herein relate to a method of wireless communication performed by an apparatus of a UE. The method may include receiving, over an unlicensed carrier, a TB that satisfies a condition and an indication that a retransmission of the TB will be according to a scheme, where the scheme indicates that a first quantity of retransmissions of the TB will be communicated over the unlicensed carrier and that a retransmission of the TB occurring after the first quantity of retransmissions of the TB will be communicated over a licensed carrier. The method may include receiving the TB over the unlicensed carrier or the licensed carrier according to the scheme when the transmission of the TB over the unlicensed carrier is unsuccessful.

Some aspects described herein relate to an apparatus of a UE for wireless communication. The apparatus may include a memory. The apparatus may include one or more processors, coupled to the memory, configured, transmit, over an unlicensed carrier and in an initial transmission of a TB satisfying a condition, an indication that a retransmission of the TB will be communicated over a licensed carrier retransmit the TB over the licensed carrier when the transmission of the TB over the unlicensed carrier is unsuccessful.

Some aspects described herein relate to an apparatus of a UE for wireless communication. The apparatus may include a memory. The apparatus may include one or more processors, coupled to the memory, configured, transmit, over an unlicensed carrier and in an initial transmission of a TB satisfying a condition, an indication that a retransmission of the TB will be according to a scheme, where the scheme indicates that a first quantity of retransmissions of the TB will be communicated over the unlicensed carrier and that one or more retransmissions of the TB occurring after the first quantity of retransmissions of the TB will be communicated over a licensed carrier retransmit the TB over the unlicensed carrier and the licensed carrier according to the scheme when the transmission of the TB over the unlicensed carrier is unsuccessful.

Some aspects described herein relate to an apparatus of a UE for wireless communication. The apparatus may include a memory. The apparatus may include one or more processors, coupled to the memory, configured, receive, over an unlicensed carrier, a TB satisfying a condition and an indication that a retransmission of the TB will be communicated over a licensed carrier receive the TB over the licensed carrier when the transmission of the TB over the unlicensed carrier is unsuccessful.

Some aspects described herein relate to an apparatus of a UE for wireless communication. The apparatus may include a memory. The apparatus may include one or more processors, coupled to the memory, configured, receive, over an unlicensed carrier, a TB that satisfies a condition and an indication that a retransmission of the TB will be according to a scheme, where the scheme indicates that a first quantity of retransmissions of the TB will be communicated over the unlicensed carrier and that a retransmission of the TB occurring after the first quantity of retransmissions of the TB will be communicated over a licensed carrier receive the TB over the unlicensed carrier or the licensed carrier according to the scheme when the transmission of the TB over the unlicensed carrier is unsuccessful.

Some aspects described herein relate to a non-transitory computer-readable medium that stores a set of instructions for wireless communication by a UE. The set of instructions, when executed by one or more processors of the UE, may cause the UE to transmit, over an unlicensed carrier and in an initial transmission of a TB satisfying a condition, an indication that a retransmission of the TB will be communicated over a licensed carrier. The set of instructions, when executed by one or more processors of the UE, may cause the UE to retransmit the TB over the licensed carrier when the transmission of the TB over the unlicensed carrier is unsuccessful.

Some aspects described herein relate to a non-transitory computer-readable medium that stores a set of instructions for wireless communication by a UE. The set of instructions, when executed by one or more processors of the UE, may cause the UE to transmit, over an unlicensed carrier and in an initial transmission of a TB satisfying a condition, an indication that a retransmission of the TB will be according to a scheme. The set of instructions, when executed by one or more processors of the UE, may cause the UE to retransmit the TB over the unlicensed carrier and the licensed carrier according to the scheme when the transmission of the TB over the unlicensed carrier is unsuccessful.

Some aspects described herein relate to a non-transitory computer-readable medium that stores a set of instructions for wireless communication by a UE. The set of instructions, when executed by one or more processors of the UE, may cause the UE to receive, over an unlicensed carrier, a TB satisfying a condition and an indication that a retransmission of the TB will be communicated over a licensed carrier. The set of instructions, when executed by one or more processors of the UE, may cause the UE to receive the TB over the licensed carrier when the transmission of the TB over the unlicensed carrier is unsuccessful.

Some aspects described herein relate to a non-transitory computer-readable medium that stores a set of instructions for wireless communication by a UE. The set of instructions, when executed by one or more processors of the UE, may cause the UE to receive, over an unlicensed carrier, a TB that satisfies a condition and an indication that a retransmission of the TB will be according to a scheme. The set of instructions, when executed by one or more processors of the UE, may cause the UE to receive the TB over the unlicensed carrier or the licensed carrier according to the scheme when the transmission of the TB over the unlicensed carrier is unsuccessful.

Some aspects described herein relate to an apparatus of a UE for wireless communication. The apparatus may include means for transmitting, over an unlicensed carrier and in an initial transmission of a TB satisfying a condition, an indication that a retransmission of the TB will be communicated over a licensed carrier. The apparatus may include means for retransmitting the TB over the licensed carrier when the transmission of the TB over the unlicensed carrier is unsuccessful.

Some aspects described herein relate to an apparatus of a UE for wireless communication. The apparatus may include means for transmitting, over an unlicensed carrier and in an initial transmission of a TB satisfying a condition, an indication that a retransmission of the TB will be according to a scheme, where the scheme indicates that a first quantity of retransmissions of the TB will be communicated over the unlicensed carrier and that one or more retransmissions of the TB occurring after the first quantity of retransmissions of the TB will be communicated over a licensed carrier. The apparatus may include means for retransmitting the TB over the unlicensed carrier and the licensed carrier according to the scheme when the transmission of the TB over the unlicensed carrier is unsuccessful.

Some aspects described herein relate to an apparatus of a UE for wireless communication. The apparatus may include means for receiving, over an unlicensed carrier, a TB satisfying a condition and an indication that a retransmission of the TB will be communicated over a licensed carrier. The apparatus may include means for receiving the TB over the licensed carrier when the transmission of the TB over the unlicensed carrier is unsuccessful.

Some aspects described herein relate to an apparatus of a UE for wireless communication. The apparatus may include means for receiving, over an unlicensed carrier, a TB that satisfies a condition and an indication that a retransmission of the TB will be according to a scheme, where the scheme indicates that a first quantity of retransmissions of the TB will be communicated over the unlicensed carrier and that a retransmission of the TB occurring after the first quantity of retransmissions of the TB will be communicated over a licensed carrier. The apparatus may include means for receiving the TB over the unlicensed carrier or the licensed carrier according to the scheme when the transmission of the TB over the unlicensed carrier is unsuccessful.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
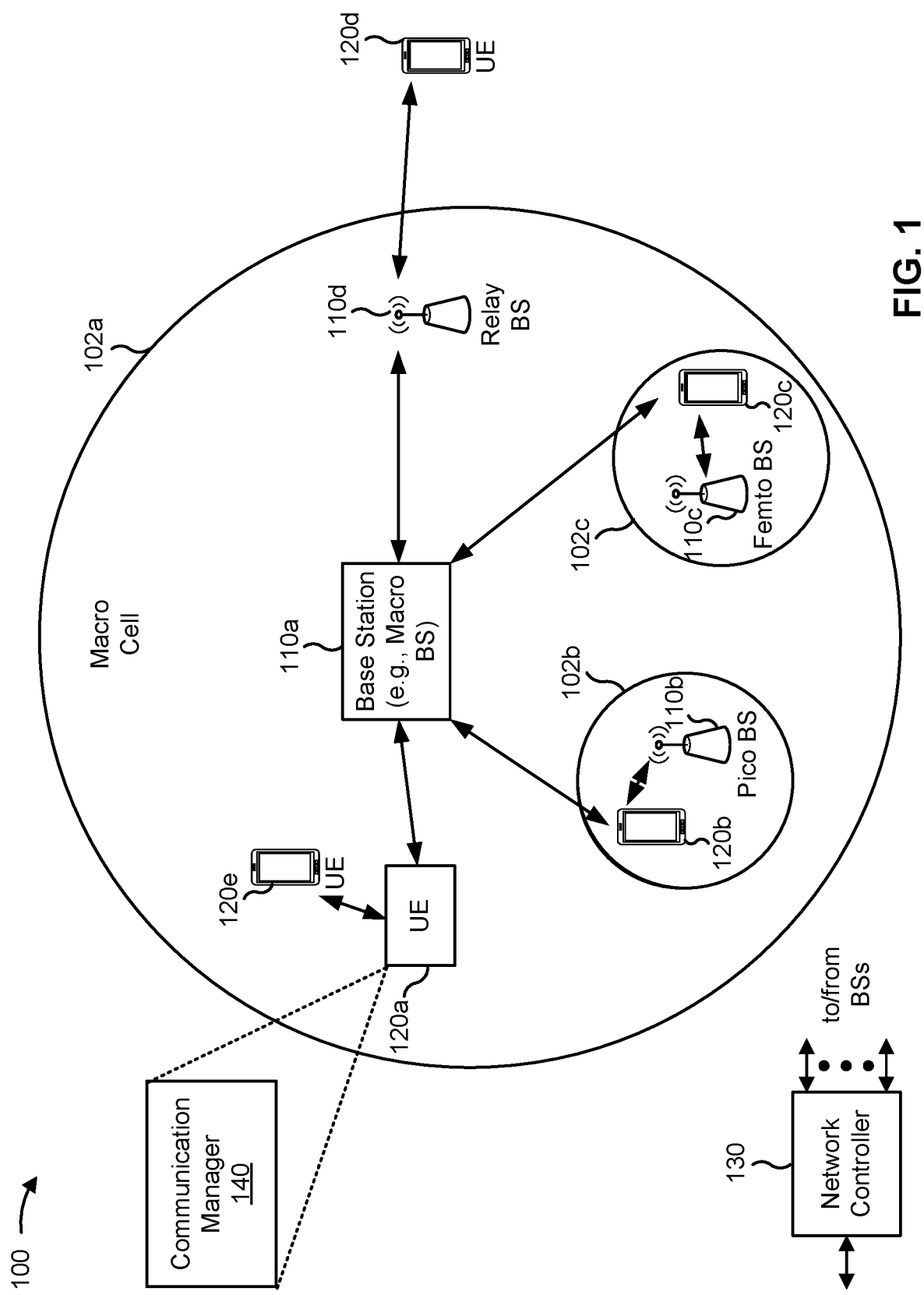
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with unlicensed-licensed cross-carrier retransmission. Additionally, or alternatively, the communication manager 140 may perform one or more other operations described herein.

As indicated above, FIG. 1 is provided as an example. Other examples may differ from what is described with regard to FIG. 1.

Figure 2:
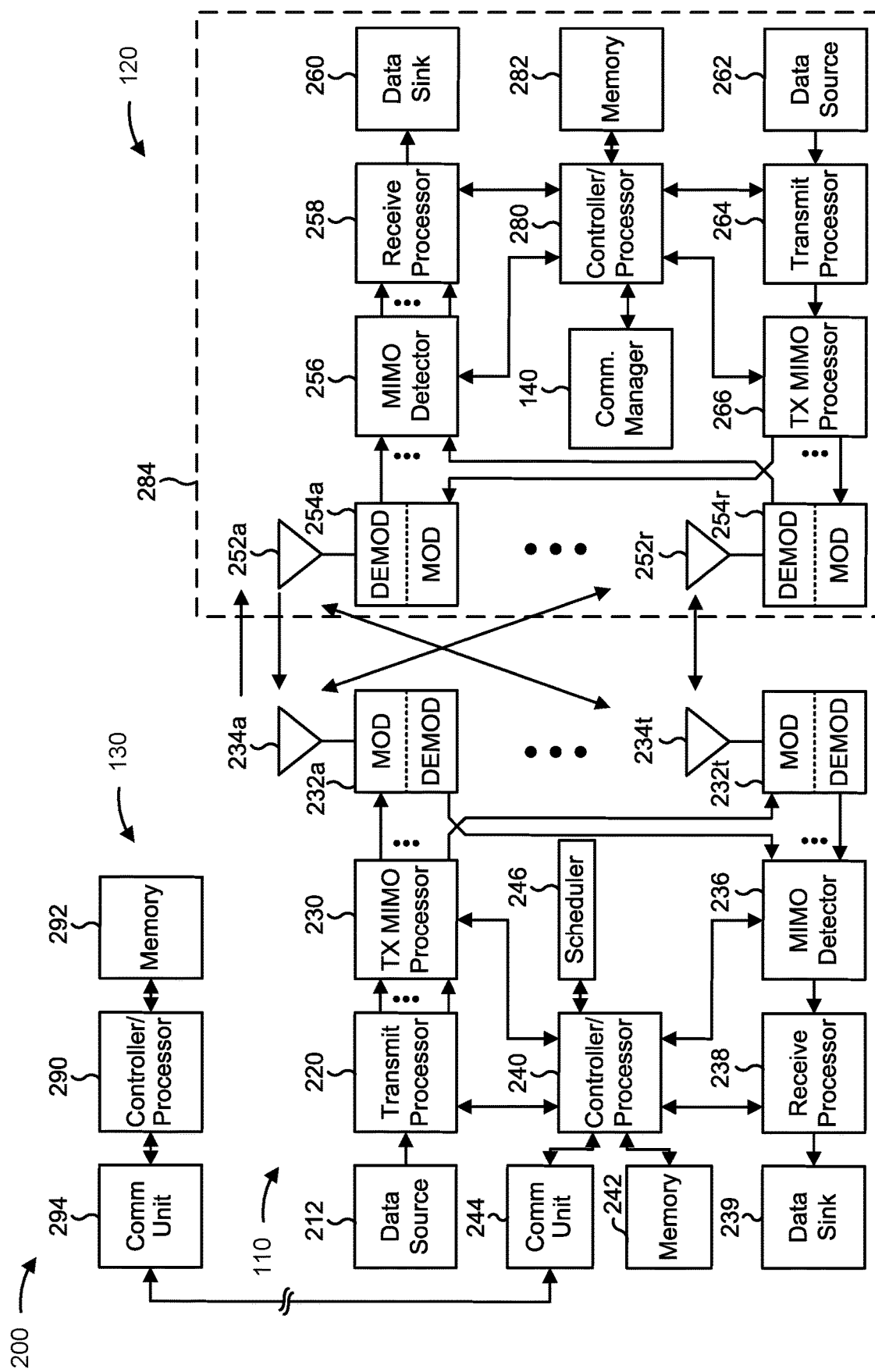
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with unlicensed-licensed cross-carrier communication, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/ or interpreting the instructions, among other examples.

In some aspects, UE 120 may include means for transmitting, over an unlicensed carrier and in an initial transmission of a transport block (TB), an indication that a retransmission of the TB will be communicated over a licensed carrier, means for retransmitting the TB over the licensed carrier when the transmission of the TB over the unlicensed carrier is unsuccessful, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, UE 120 may include means for transmitting, over an unlicensed carrier and in an initial transmission of a TB, an indication that a retransmission of the TB will be communicated according to a scheme, wherein the scheme indicates that a first quantity of retransmissions of the TB will be communicated over the unlicensed carrier and that one or more retransmissions of the TB occurring after the first quantity of retransmissions of the TB will be communicated over a licensed carrier, means for retransmitting the TB over the unlicensed carrier and the licensed carrier according to the scheme when the transmission of the TB over the unlicensed carrier is unsuccessful, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, UE 120 may include means for receiving, over an unlicensed carrier, a TB corresponding satisfying a condition and an indication that a retransmission of the TB will be communicated over a licensed carrier, means for receiving the TB over the licensed carrier over the unlicensed carrier when the transmission of the TB over the unlicensed carrier is unsuccessful, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, UE 120 may include means for receiving, over an unlicensed carrier, a TB that satisfies a condition and an indication that a retransmission of the TB will be communicated according to a scheme, wherein the scheme indicates that a first quantity of retransmissions of the TB will be communicated over the unlicensed carrier and that one or more retransmissions of the TB occurring after the first quantity of retransmissions of the TB will be communicated over a licensed carrier, means for receiving the TB over the unlicensed carrier or the licensed carrier according to the scheme when the transmission of the TB over the unlicensed carrier is unsuccessful, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
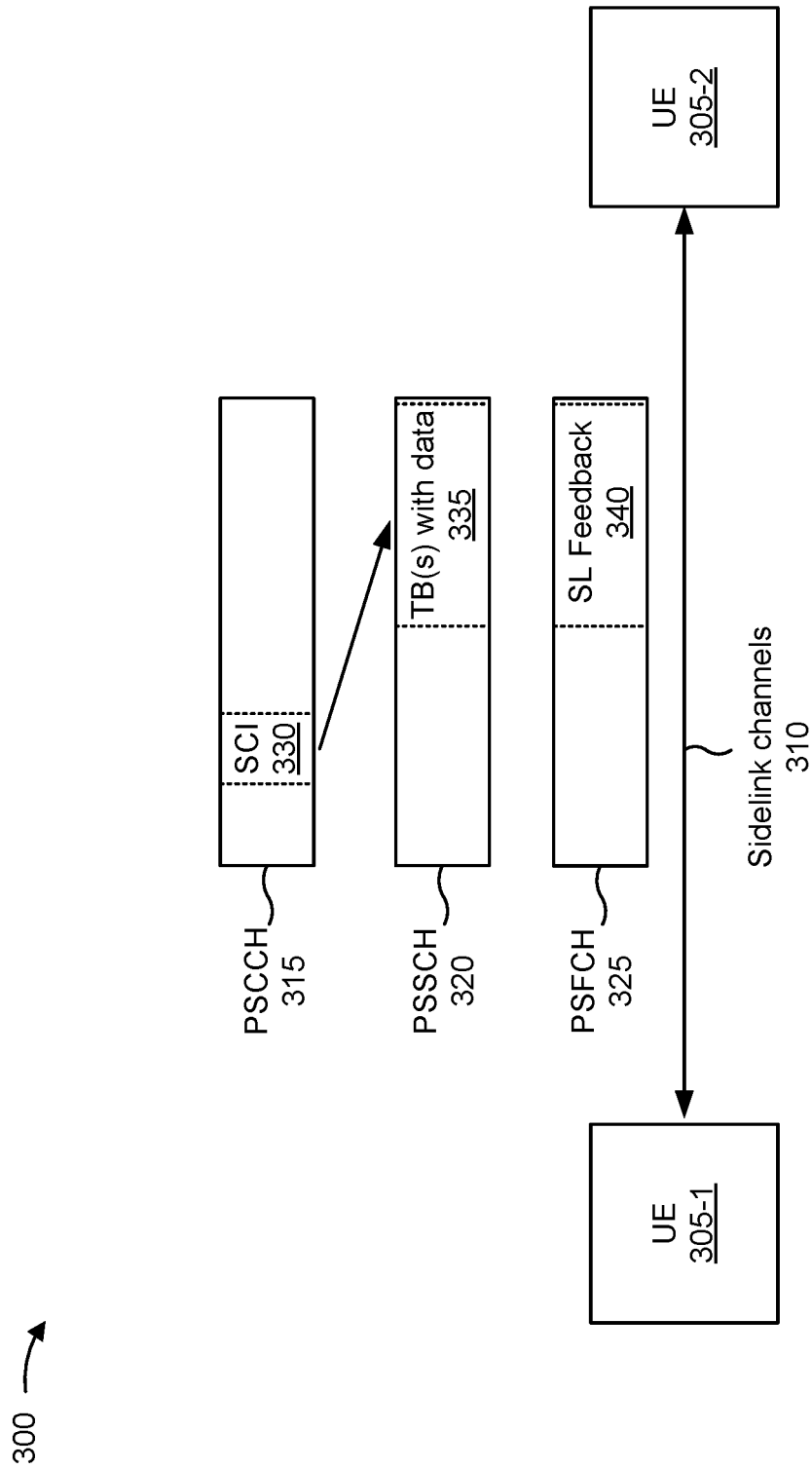
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking.

In some aspects, the UEs 305 (e.g., UE 305-1 and/or UE 305-2) may communicate using the one or more sidelink channels 310 over a licensed carrier and/or an unlicensed carrier. For example, the first UE 305-1 may transmit a communication using the one or more sidelink channels 310 for V2X communication over an unlicensed carrier and may transmit a retransmission of the communication using the one or more sidelink channels 310 for V2X communication over a licensed carrier, as described elsewhere herein. It should be understood that references herein to an "unlicensed carrier" can refer to a carrier not associated with a central scheduler, such as a carrier on which a listen-before-talk (LBT) operation is performed to secure channel access, or a carrier on which channel access is negotiated or controlled by the UEs communicating via the carrier.

In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel.

The PSSCH 320 may be used to communicate data, similar to a physical downlink shared channel (PDSCH) and/or a physical uplink shared channel (PUSCH) used for cellular communications with a base station 110 via an access link or an access channel. As an example, the PSCCH 315 may carry sidelink control information (SCI) 330. The SCI 330 may indicate various control information used for sidelink communications, such as one or more resources (e.g., time resources, frequency resources, and/or spatial resources) and/or an indication as to a carrier (e.g., a licensed carrier and/or an unlicensed carrier) over which a retransmission of a communication will occur, as described elsewhere herein. A TB 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some cases, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some cases, the one or more sidelink channels 310 may use resource pools. For example, a scheduling assignment (e.g., included in SCI 330) may be transmitted in sub-channels using specific resource blocks (RBs) across time. In some cases, data transmissions (e.g., on the PSSCH 320) associated with a scheduling assignment may occupy adjacent RBs in the same subframe as the scheduling assignment (e.g., using frequency division multiplexing). In some cases, a scheduling assignment and associated data transmissions may not be transmitted on adjacent RBs.

In some cases, a UE 305 may operate using a transmission mode where resource selection and/or scheduling is performed by the UE 305 (e.g., rather than a base station 110). In some cases, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

In some cases, the UE 305 may perform resource selection and/or scheduling using SCI 330 received in the PSCCH 315, which may indicate occupied resources and/or channel parameters. In some cases, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some cases, a UE 305 may generate a sidelink grant that indicates one or more parameters for semi-persistent scheduling (SPS), such as a periodicity of a sidelink transmission. In some cases, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
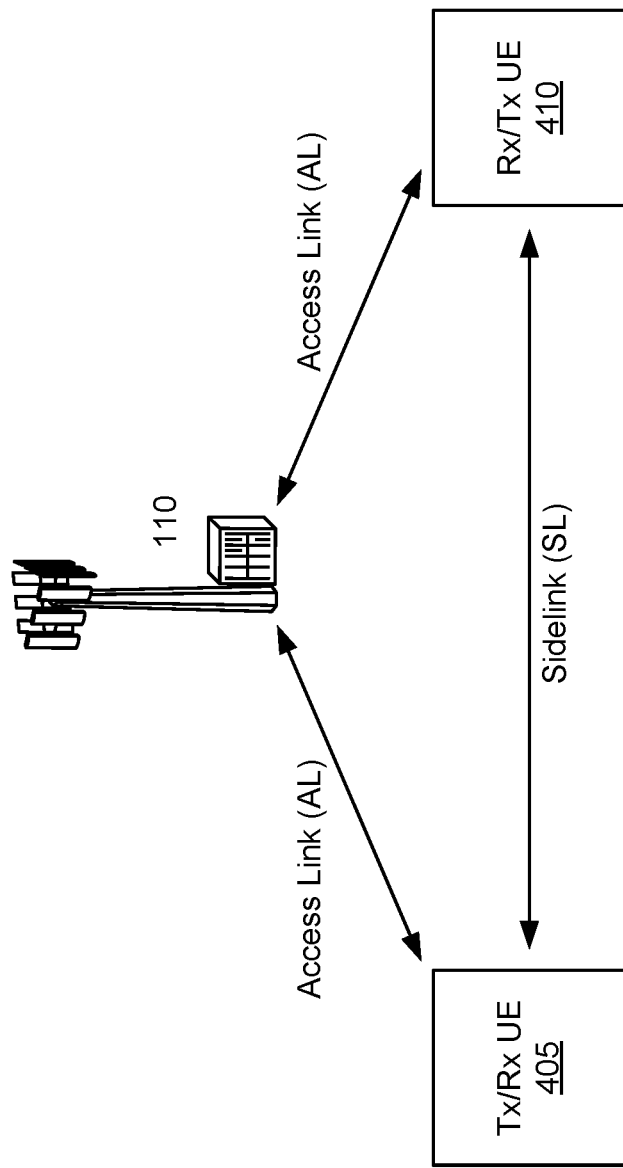
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. In some sidelink modes, the base station 110 may communicate with the Rx/Tx UE 410 via a second access link.

The Tx/Rx UE 405 and/or the Rx/Tx UE 410 may correspond to one or more UEs described elsewhere herein, such as the UE 120 of FIG. 1 and/or the UEs 305 of FIG. 3. Thus, a direct link between UEs (e.g., a direct link between UE 120 of FIG. 1, UEs 305 of FIG. 3, Tx/Rx UE 405 of FIG. 4, and/or Rx/Tx UE 410 of FIG. 4, such as via a PC5 interface) may be referred to as a sidelink, and a direct link between a base station and a UE (e.g., a direct link between base station 110 and UE 120 of FIG. 1, UEs 305 of FIG. 3, Tx/Rx UE 405 of FIG. 4, and/or Rx/Tx UE 410 of FIG. 4, such as via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects described herein, a Tx UE 405 may transmit an initial transmission of a transport block (TB) on an unlicensed carrier, and may transmit a retransmission of the TB on a licensed carrier and/or an unlicensed carrier.

As indicated above, FIG. 4 is provided as an example. Other examples may differ from what is described with respect to FIG. 4.

Figure 5:
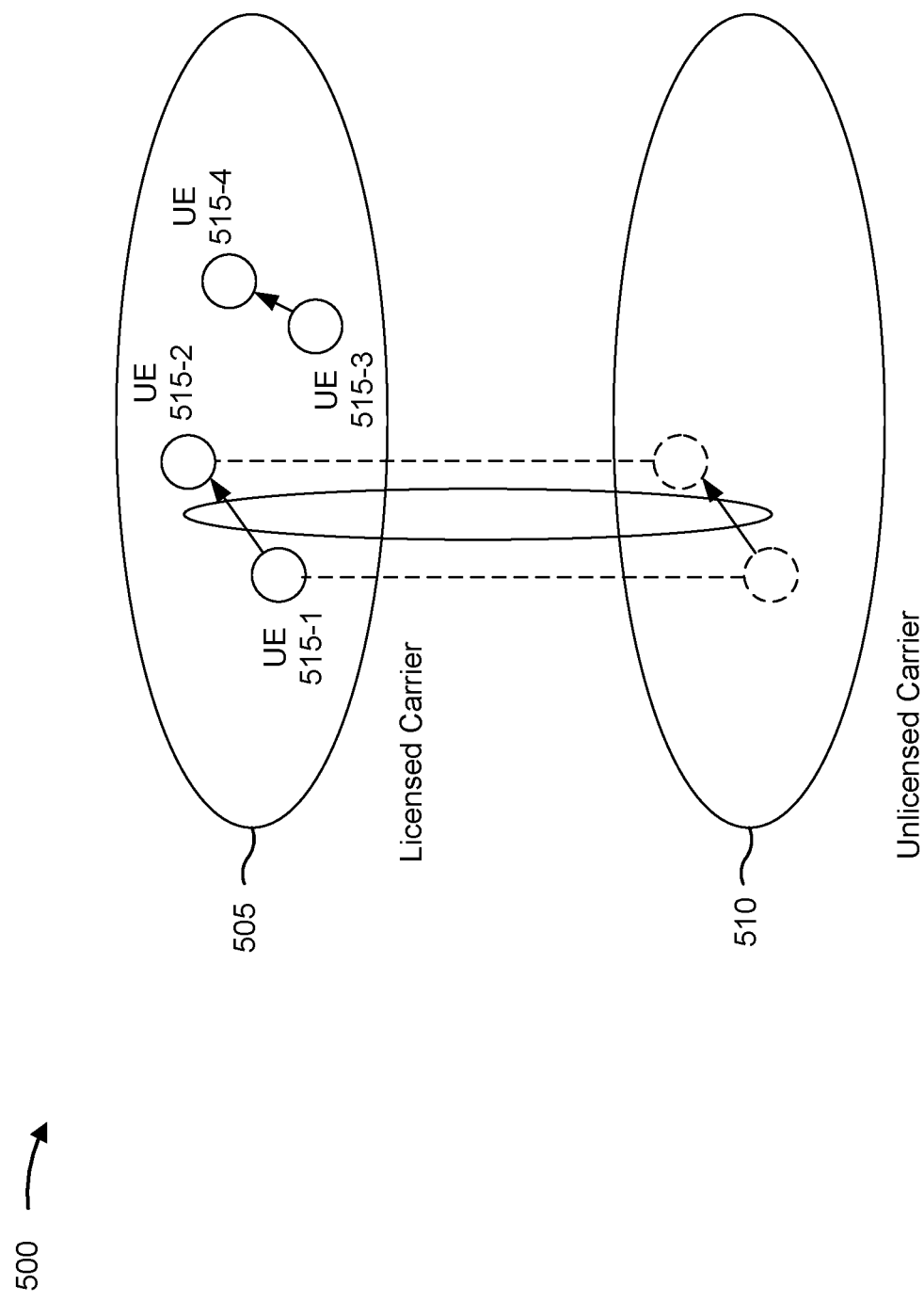
FIG. 5 is a diagram illustrating an example of sidelink communication over a licensed carrier and an unlicensed carrier, in accordance with the present disclosure.

FIG. 5 is a diagram illustrating an example 500 of sidelink communication over a first carrier (shown as a licensed carrier 505) and a second carrier (shown as an unlicensed carrier 510), in accordance with various aspects of the present disclosure. As shown in FIG. 5, UEs 515 (e.g., UE 515-1, UE 515-2, UE 515-3, and/or UE 515-4) may communicate with one another at various times using a sidelink communication via the licensed carrier 505. In some cases, the sidelink communication may occur in the presence of the unlicensed carrier 510. The UEs 515 may correspond to one or more UEs described elsewhere herein, such as the UE 120 of FIG. 1, UEs 305 of FIG. 3, Tx/Rx UE 405 of FIG. 4, and/or Rx/Tx UE 410 of FIG. 4. In some aspects, the second carrier may be associated with an LBT channel access mechanism, and/or access to the second carrier may be controlled or negotiated by the UEs 515. In some aspects, the first carrier may be a carrier associated with license based access, such as by licensing network operators. The first carrier may be a carrier utilizing licensed spectrum, and the second carrier may be a carrier utilizing a shared spectrum (commonly referred to as an unlicensed spectrum). A carrier is a frequency allocation that a UE 515 can use to transmit or receive communications.

In some cases, one or more UEs 515 may be communicating with one or more other UEs 515 via sidelink communications. For example, as shown in FIG. 5, the UE 515-1 may be in sidelink communication with the UE 515-2 and the UE 515-3 may be in sidelink communication with UE 515-4. The sidelink communications may occur without involvement of a base station (e.g., base station 110). In some cases, the UEs 515 may be in radio resource allocation (RRA) Mode 2 sidelink communication (referred to herein as Mode 2) allowing standalone deployment of the UEs 515. In Mode 2, the UEs 515 may sense to occupy and reserve channel access (as opposed to RRA Mode 1 sidelink communication, in which network control is used and the UEs 515 receive grants (e.g., from a base station 110) for channel access).

In some cases, sidelink communication may be used in the V2X domain to transmit traffic corresponding to a high reliability service, such as, for example, basic safety messages (BSMs). "High reliability service" refers to a service, a function, and/or an application, among other examples, for which communications associated with the service, the function, and/or the application, have high reliability requirements (e.g., a communication transmission success rate that is greater than or equal to a threshold, such as 99%, 99.5%, and/or 99.9%, among other examples). As sidelink use cases evolve, ever growing amounts of data transfer will present an increasing burden to the licensed spectrum (e.g., the licensed carrier 505). The off-loading of data to the shared spectrum (e.g., the unlicensed carrier 510) may be one way to address the data bandwidth limitations of the licensed spectrum. However, transmissions over an unlicensed carrier may be prone to interference and/or may be subject to channel access restrictions (e.g., an LBT restriction), which may cause transmissions over the unlicensed carrier to be less reliable than transmissions over the licensed carrier.

In some cases, to satisfy high reliability requirements associated with a communication (e.g., a BSM transmitted using V2X communication by a UE 120 included in a vehicle), the UE may be configured to transmit the communication over the licensed carrier, rather than over the unlicensed carrier. However, as sidelink use cases evolve and the quantity of devices transmitting over the limited resources of the licensed carrier increases, a quantity of collisions experienced by communications over the licensed carrier may increase. The increase in the quantity of collisions may impact the reliability of communications transmitted over the licensed carrier.

Some techniques and apparatuses described herein may relate to a carrier selection scheme that utilizes unlicensed and licensed carriers to transmit communications satisfying a condition, such as associated with a high reliability service (e.g., a service having a high reliability requirement). For example, the carrier selection scheme may indicate that an initial transmission of a communication associated with a high reliability service is to be transmitted over an unlicensed band and that any retransmissions of the communication are to be transmitted over the licensed band (and optionally also over the unlicensed band). By utilizing the unlicensed carrier for initial communications, a volume of traffic transmitted over the licensed carrier may be decreased (e.g., relative to transmitting all communications associated with a high reliability service over the licensed carrier). The decreased volume of traffic may result in a reduction in the number of collisions experienced by communications transmitted over the licensed carrier, which may increase a reliability associated with the licensed carrier. In cases where the reliability of the unlicensed carrier fails to meet the reliability requirements of the high reliability service (e.g., the second UE fails to receive the initial transmission), the reliability requirements may be satisfied by retransmitting the communication over the licensed carrier.

As indicated above, FIG. 5 is provided as an example. Other examples may differ from what is described with respect to FIG. 5.

Figure 6:
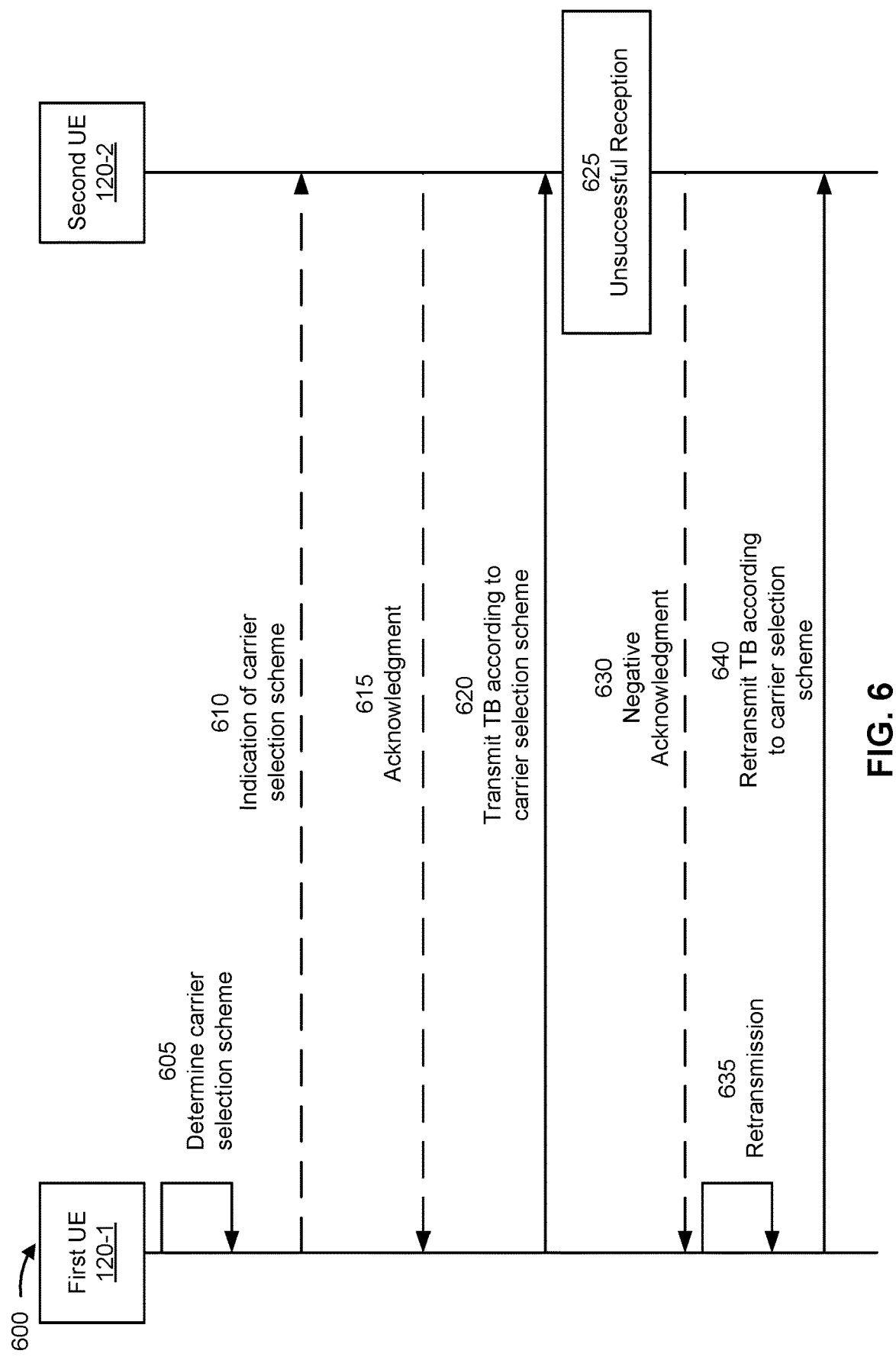
FIG. 6 is a diagram illustrating an example associated with unlicensed-licensed cross-carrier retransmission, in accordance with the present disclosure.

FIG. 6 is a diagram illustrating an example 600 associated with unlicensed-licensed cross-carrier retransmission, in accordance with the present disclosure. As shown in FIG. 6, a first UE 120-1 and a second UE 120-2 may communicate with one another. In some aspects, the first UE 120-1 and the second UE 120-2 may communicate using sidelink communications over an unlicensed carrier and a licensed carrier, as described elsewhere herein.

As shown by reference number 605, the first UE 120-1 may determine a carrier (e.g., a licensed carrier such as the licensed carrier 505 and/or an unlicensed carrier such as the unlicensed carrier 510) for transmitting a TB to the second UE 120-2. In some aspects, the first UE 120-1 may determine the carrier based at least in part on a carrier selection scheme. A TB is a packet of data that is passed between a medium access control layer and a physical layer. A TB may undergo physical layer processing before being mapped onto a physical channel for transmission.

The carrier selection scheme may indicate a pattern and/or criteria for determining when to transmit the TB and/or any retransmissions of the TB over an unlicensed carrier and/or a licensed carrier. In some aspects, the first UE 120-1 may determine to transmit the TB according to a carrier selection scheme based at least in part on a priority (e.g., a QoS priority value or a different priority) associated with the TB satisfying a priority threshold, the TB being associated with a particular type of application or service (e.g., an application or service having high reliability requirements), a packet delay budget (PDB) associated with the TB satisfying a PDB threshold, a traffic load of the licensed carrier (such as a quantity of requests for retransmissions of a non-decoded TB) satisfying a load threshold, a traffic load of the unlicensed carrier (such as a channel busy ratio or a channel occupancy ratio) satisfying a load threshold, and/or a quantity of failed transmissions over the unlicensed carrier satisfying a failure threshold, among other examples.

Alternatively, and/or additionally, the first UE 120-1 may determine to transmit the TB according to the carrier selection scheme based at least in part on receiving an indication from another device (e.g., a base station 110) indicating that the TB is to be transmitted according to the carrier selection scheme. For example, the first UE 120-1 may receive a communication indicating that a TB is to be initially transmitted over the unlicensed carrier and any subsequent retransmissions of the TB are to be transmitted over the licensed carrier when the TB is associated with a high reliability service.

The carrier selection scheme may indicate a first carrier for communicating an initial transmission of a TB, a second carrier for communicating a first quantity of retransmissions of the TB, and/or a third carrier for communicating a second quantity of retransmissions of the TB, among other examples.

The first carrier may be the same as, or different from, the second carrier and/or the third carrier. For example, the first carrier may be an unlicensed carrier, the second carrier may be a licensed carrier, and the third carrier may be the licensed carrier. As another example, the first carrier may be the unlicensed carrier, the second carrier may be the unlicensed carrier, and the third carrier may be the unlicensed carrier. As yet another example, the first carrier may be the unlicensed carrier, the second carrier may be the unlicensed carrier, and the third carrier may be the licensed carrier. The combinations of carriers are not limited to the examples described herein and may include different combinations of utilizing the licensed carrier and/or the unlicensed carrier to communicate the TB (including retransmissions of the TB) to the second UE 120-2.

Similarly, the first quantity may be the same as, or different from, the second quantity. In some aspects, the first quantity may be within a range of 0 through infinity and the second quantity may be within a range of 0 through infinity. As an example, the carrier selection scheme may indicate that an initial transmission of a TB is to be over the first carrier. The carrier selection scheme may indicate that the first quantity and/or the second quantity is equal to 0 when the TB is not to be retransmitted over the second carrier and/or the third carrier, respectively. The carrier selection scheme may indicate that the first quantity is equal to infinity when all retransmissions of the TB are to be over the second carrier. The carrier selection scheme may indicate that the second quantity is equal to infinity when all retransmissions of the TB following the first quantity of retransmissions of the TB are to be over the third carrier.

In some aspects, the carrier selection scheme may indicate (e.g., to the first UE 120-1) a type of retransmission associated with the first quantity and/or the second quantity. In some aspects, the type of retransmission may be a blind retransmission and/or a feedback-triggered transmission. A blind retransmission may be a retransmission of a TB that is not triggered by receiving feedback (e.g., a negative acknowledgment or NACK) associated with a previous transmission (e.g., an initial transmission and/or a retransmission) of the TB. A feedback-triggered retransmission may be a retransmission of a TB that is triggered based at least in part on receiving feedback associated with a previous transmission of the TB.

As an example, the first UE 120-1 may determine, based at least in part on the carrier selection scheme, that none or one or more of the first quantity of retransmissions over the second carrier are to be blind retransmissions (e.g., the first and second retransmissions of the TB over the second carrier are to be blind retransmissions) and/or that none or one or more of the first quantity of retransmissions over the second carrier are to be feedback triggered retransmissions (e.g., the third and fourth retransmissions of the TB over the second carrier are to be feedback retransmissions). Alternatively, and/or additionally, the first UE 120-1 may determine, based at least in part on the carrier selection scheme, that none or one or more of the second quantity of retransmissions over the third carrier are to be blind retransmissions (e.g., the first and second retransmissions of the TB over the third carrier are to be blind retransmissions) and/or that none or one or more of the second quantity of transmissions over the third carrier are to be feedback triggered retransmissions (e.g., the third and fourth retransmissions of the TB over the third carrier are to be feedback retransmissions).

In some aspects, the carrier selection scheme may indicate a type of carrier over which a retransmission is to be transmitted based at least in part on a type of the retransmission. For example, the first UE 120-1 may determine, based at least in part on the carrier selection scheme, that all blind retransmissions are to be transmitted over the unlicensed carrier (e.g., the first carrier) and that all feedback-triggered retransmissions are to be transmitted over the unlicensed carrier (e.g., the second carrier and/or the third carrier).

In some aspects, the first UE 120-1 may determine the first quantity and/or the second quantity. For example, the first UE 120-1 may determine one or more of these quantities based at least in part on an RSSI associated with the licensed carrier, an RSSI associated with the unlicensed carrier, a CBR associated with the licensed carrier, a CBR associated with the unlicensed carrier, a priority associated with the TB (e.g., a priority of the TB, a priority of a service associated with the TB, a reliability requirement associated with the TB (e.g., whether the TB corresponds to a high reliability service having a high reliability requirement), a priority of a function associated with the TB, and/or a priority of an application associated with the TB, among other examples), a PDB associated with the TB, and/or a remaining PDB associated with the TB, among other examples.

In some aspects, the first UE 120-1 may determine the first quantity and/or the second quantity prior to an initial transmission of the TB over the first carrier. Alternatively, and/or additionally, the first UE 120-1 may determine the first quantity and/or the second quantity after the initial transmission of the TB over the first carrier, after one or more retransmissions of the TB over the second carrier, and/or after one or more retransmissions of the TB over the third carrier.

As an example, the first UE 120-1 may determine the first quantity (e.g., based at least in part on an RSSI associated with the licensed carrier, an RSSI associated with the unlicensed carrier, a CBR associated with the licensed carrier, a CBR associated with the unlicensed carrier, a priority associated with the TB, a priority of a function associated with the TB, a PDB associated with the TB, and/or a remaining PDB associated with the TB, among other examples) during a time period in which the first quantity of retransmissions are transmitted to the second UE 120-2 (e.g., prior to transmitting a last retransmission of the first quantity of retransmissions). The last retransmission of the first quantity of retransmissions may include an indication that the retransmission is the last retransmission of the first quantity of retransmissions and/or that a next retransmission is a first retransmission of the second quantity of retransmissions. For example, the last retransmission of the first quantity of retransmissions may indicate a switch to retransmission on a licensed carrier (e.g., by a single-bit indicator, and with the understanding that a reserved resource for the last retransmission of the first quantity of carriers, indicated as an unlicensed resource, is to be treated as a licensed reservation (such as using a mapping as described elsewhere herein).

In some aspects, the first UE 120-1 may determine the carrier selection scheme, the first quantity, and/or the second quantity based at least in part on information received from another device. In some aspects, a wireless node associated with the licensed carrier (e.g., the base station 110, a node handling channel access for the licensed carrier) may provide the first UE 120-1 with information indicating the carrier selection scheme, the first carrier, the second carrier, the first quantity, and/or the second quantity associated with transmitting and/or retransmitting the TB. Alternatively, and/or additionally, the wireless node may provide the first UE 120-1 information for determining the carrier selection scheme, the first carrier, the second carrier, the first quantity, and/or the second quantity. For example, the wireless node may provide the first UE 120-1 with information indicating that a TB corresponding to a high reliability service is to be transmitted according to a first carrier selection scheme and/or that a TB that does not correspond to a high reliability service is to be transmitted according to a second carrier selection scheme, is not to be transmitted according to the first carrier selection scheme, and/or is not to be transmitted according to any carrier selection scheme (e.g., all transmissions and retransmissions of the TB are to be over the unlicensed carrier).

In some aspects, the first UE 120-1 may determine the carrier selection scheme based at least in part on a capability of the second UE 120-2. For example, the first UE 120-1 may determine the carrier selection scheme based at least in part on determining (e.g., based at least in part on information received from the second UE 120-2) whether the second UE 120-2 is able to receive the TB over the unlicensed carrier, whether the second UE 120-2 is able to monitor the licensed carrier and the unlicensed carrier, and/or whether monitoring the licensed carrier and the unlicensed carrier will negatively impact an operation of the second UE 120-2 (e.g., whether monitoring the licensed carrier and the unlicensed carrier will drain a battery of the second UE 120-2), among other examples.

Optionally, as shown by reference number 610, the first UE 120-1 may transmit an indication of the carrier selection scheme to the second UE 120-2. In some aspects, the indication is transmitted via SCI transmitted prior to the TB being initially transmitted to the second UE 120-2. For example, the first UE 120-1 may transmit SCI reserving resources on the licensed carrier (e.g., the second carrier) for a retransmission of the TB. Alternatively, and/or additionally, the indication may be transmitted in conjunction with the TB.

In some aspects, the indication may identify resources of the unlicensed carrier. For example, the first UE 120-1 may transmit SCI reserving resources on the unlicensed carrier. The resources of the unlicensed carrier may be mapped to resources of the licensed carrier, for example, by a mapping. In some aspects, the mapping may be pre-configured, such as based at least in part on being specified in a wireless communication specification, signaling pre-configuring the mapping, or the like. The second UE 120-2 may identify the resources of the licensed carrier for retransmission of the TB based at least in part on the resources of the unlicensed carrier being mapped to the resources of the licensed carrier.

In some aspects, the indication includes a single bit. For example, the indication may include a single bit indicating a value. The value may be mapped to a particular carrier selection scheme. The second UE 120-2 may receive the value and may determine that the TB is to be transmitted according to the particular carrier selection scheme based at least in part on the particular carrier selection scheme being mapped to the value.

In some implementations, the indication may be a first value (e.g., 1) when the TB is to be communicated according to the carrier selection scheme. The indication may be a second value (e.g., 0) or the first UE 120-1 may not transmit an indication to the second UE 120-2 when the TB is not to be communicated according to any carrier selection scheme.

Optionally, as shown by reference number 615, the second UE 120-2 may transmit an acknowledgment to the first UE 120-1. For example, the first UE 120-1 may be unaware as to whether the second UE 120-2 is able to monitor the shared spectrum (e.g., the unlicensed carrier) and may transmit the indication to the second UE 120-2 based at least in part on being unaware as to whether the second UE 120-2 is able to monitor the shared spectrum. The second UE 120-2 may receive the indication transmitted by the first UE 120-1 and may determine a carrier selection scheme according to which the TB is to be transmitted. The second UE 120-2 may send a positive acknowledgment (e.g., an ACK) indicating that the indication was received by the second UE 120-2, that the second UE 120-2 is able to monitor the shared spectrum, and/or that the second UE 120-2 determined that the TB is to be transmitted according to the carrier selection scheme.

As shown by reference number 620, the first UE 120-1 may transmit the TB to the second UE 120-2 according to the carrier selection scheme. For example, the carrier selection scheme may indicate that a first transmission of the TB is to be over the unlicensed carrier (e.g., the first carrier) based at least in part on the TB corresponding to a high reliability service, a load of the licensed carrier satisfying a load threshold, a load of the unlicensed carrier satisfying a load threshold, and/or a PDB associated with the TB satisfying a PDB threshold, among other examples. The first UE 120-1 may transmit the TB over the unlicensed carrier according to the carrier selection scheme.

In some implementations, the TB may indicate resources for any subsequent retransmission of the TB. For example, the TB may include the indication described above and/or may include a reservation of resources on the licensed carrier and/or the unlicensed carrier for retransmission of the TB.

In some aspects, as shown by reference number 625, the second UE 120-2 may fail to successfully receive the TB from the first UE 120-1. In some aspects, as shown by reference number 630, the second UE 120-2 may transmit a negative acknowledgment to the first UE 120-1 indicating that the TB was not successfully received. For example, the second UE 120-2 may monitor resources reserved on the unlicensed carrier for transmission of the TB and may fail to receive the TB on the reserved resources. The second UE 120-2 may transmit the negative acknowledgment to the second UE 120-2 based at least in part on failing to receive the TB on the reserved resources. In some aspects, the second UE 120-2 may not transmit the negative acknowledgment to the first UE 120-1.

As shown by reference number 635, the first UE 120-1 may determine to retransmit the TB to the second UE 120-2. In some implementations, the retransmission may be a feedback triggered retransmission. For example, the first UE 120-1 may receive the negative acknowledgment from the second UE 120-2, and the first UE 120-1 may determine to retransmit the TB based at least in part on receiving the negative acknowledgement.

In some aspects, the retransmission may be a blind retransmission. For example, the second UE 120-2 may not transmit the negative acknowledgment to the first UE 120-1, and the first UE 120-1 may determine to retransmit the TB to the second UE 120-2 based at least in part on not receiving a communication (e.g., an ACK or a NACK) from the second UE 120-2 prior to an expiration of a time period.

In some aspects, the first UE 120-1 may determine that the initial transmission of the TB to the second UE 120-2 was unsuccessful based at least in part on a quantity of LBT failures and the retransmission may be a blind retransmission based at least in part on the quantity of LBT failures. For example, the transmission of the TB may be delayed based at least in part on a quantity of LBT failures. The first UE 120-1 may determine that the quantity of LBT failures satisfies a failure threshold and/or that an amount of time the transmission has been delayed satisfies a time threshold. The first UE 120-1 may determine that the initial transmission of the TB to the second UE 120-2 was unsuccessful and/or to retransmit the TB based at least in part on the quantity of LBT failures satisfying the failure threshold and/or the amount of time that the transmission has been delayed satisfying the time threshold.

As shown by reference number 640, the first UE 120-1 may retransmit the TB according to the carrier selection scheme. For example, the first UE 120-1 may determine, based at least in part on the carrier selection scheme, that the first quantity of retransmissions are to be transmitted over the second carrier (e.g., the licensed carrier or the unlicensed carrier). The first UE 120-1 may determine that the retransmission of the TB is a first retransmission of the TB and that the first quantity of retransmissions includes the first retransmission of the TB. The first UE 120-1 may retransmit the TB over the second carrier (e.g., the licensed carrier or the unlicensed carrier) based at least in part on the first quantity of retransmissions including the first retransmission of the TB.

In some aspects, the retransmission of the TB indicates resources (e.g., on the licensed carrier and/or the unlicensed carrier according to the carrier selection scheme) for one or more subsequent retransmissions of the TB. In some aspects, each retransmission of the TB indicates resources for a next retransmission of the TB. For example, a first retransmission of the TB may indicate resources (e.g., on the licensed carrier and/or the unlicensed carrier according to the carrier selection scheme) for a second retransmission of the TB and the second retransmission of the TB may indicate resources (e.g., on the licensed carrier and/or the unlicensed carrier according to the carrier selection scheme) for a third retransmission of the TB.

As described herein, the first UE 120-1 may utilize the unlicensed carrier for initial communication of a TB and, in cases where the second UE fails to receive the initial communication of the TB, the first UE 120-1 may retransmit the TB over the licensed carrier. In this way, the first UE 120-1 may ensure that any high reliability requirements associated with the TB are satisfied while reducing a volume of traffic transmitted over the licensed carrier (e.g., relative to transmitting the initial communication of the TB and all retransmissions of the TB over the licensed carrier).

As indicated above, FIG. 6 is provided as an example. Other examples may differ from what is described with respect to FIG. 6.

Figure 7:
FIGS. 7-10 are diagrams illustrating example processes associated with unlicensed-licensed cross-carrier retransmission, in accordance with the present disclosure.

FIG. 7 is a diagram illustrating an example process 700 performed, for example, by an apparatus of a UE, in accordance with the present disclosure. Example process 700 is an example where the apparatus of the UE (e.g., UE 120) performs operations associated with unlicensed-licensed cross-carrier retransmission.

As shown in FIG. 7, in some aspects, process 700 may include transmitting, over an unlicensed carrier and in an initial transmission of a TB satisfying a condition, an indication that a retransmission of the TB will be communicated over a licensed carrier (block 710). For example, the apparatus (e.g., using communication manager 140 and/or transmission component 1104, depicted in FIG. 11) may transmit, over an unlicensed carrier and in an initial transmission of a TB satisfying a condition, an indication that a retransmission of the TB will be communicated over a licensed carrier, as described above. In some aspects, the condition may be satisfied when the TB is associated with a high reliability service.

As further shown in FIG. 7, in some aspects, process 700 may include retransmitting the TB over the licensed carrier when the transmission of the TB over the unlicensed carrier is unsuccessful (block 720). For example, the apparatus (e.g., using communication manager 140 and/or transmission component 1104, depicted in FIG. 11) may retransmit the TB over the licensed carrier when the transmission of the TB over the unlicensed carrier is unsuccessful, as described above.

Process 700 may include additional aspects, such as any single aspect or any combination of aspects described below and/or in connection with one or more other processes described elsewhere herein.

In a first aspect, the TB is transmitted over the unlicensed carrier based at least in part on the TB corresponding to a high reliability service.

In a second aspect, the condition includes one or more of a priority associated with the TB satisfies a priority threshold, the TB is associated with a particular type of application, a PDB associated with the TB satisfies a PDB threshold, a first traffic load of the licensed carrier satisfies a first load threshold, a second traffic load of the unlicensed carrier satisfies a second load threshold, a quantity of unsuccessful transmissions over the unlicensed carrier satisfies a failure threshold, or the UE receives an indication that the TB is to be transmitted over the unlicensed carrier.

In a third aspect, the TB is retransmitted over the licensed carrier based at least in part on a high reliability service being identified as a service for which TBs associated with the service are to be retransmitted over the licensed carrier.

In a fourth aspect, all retransmissions of TBs transmitted over the unlicensed carrier are retransmitted over the licensed carrier.

In a fifth aspect, the TBs initially transmitted over the unlicensed carrier are retransmitted over the licensed carrier according to a specific pattern.

In a sixth aspect, process 700 includes transmitting information indicating a resource in the licensed carrier to be used for a subsequent retransmission of the TB.

In a seventh aspect, the indication comprises a single bit.

In an eighth aspect, the TB is retransmitted over a non-reserved resource of the licensed carrier based at least in part on the transmission of the TB over the unlicensed carrier being unsuccessful.

In a ninth aspect, SCI associated with transmitting the TB over the unlicensed carrier reserves a resource of the unlicensed carrier for the retransmission of the TB, wherein the resource of the unlicensed carrier is mapped to a resource of the licensed carrier, and wherein the TB is retransmitted over the resource of the licensed carrier based at least in part on the resource of the unlicensed carrier being mapped to the resource of the licensed carrier.

In a tenth aspect, the transmission of the TB over the unlicensed carrier is unsuccessful based at least in part on a quantity of LBT failures, the method further comprises transmitting the TB over the licensed carrier.

In an eleventh aspect, the TB is transmitted over the licensed carrier based at least in part on the quantity of LBT failures satisfying a threshold.

In a twelfth aspect, the TB is transmitted over the licensed carrier based at least in part on a remaining PDB satisfying a threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
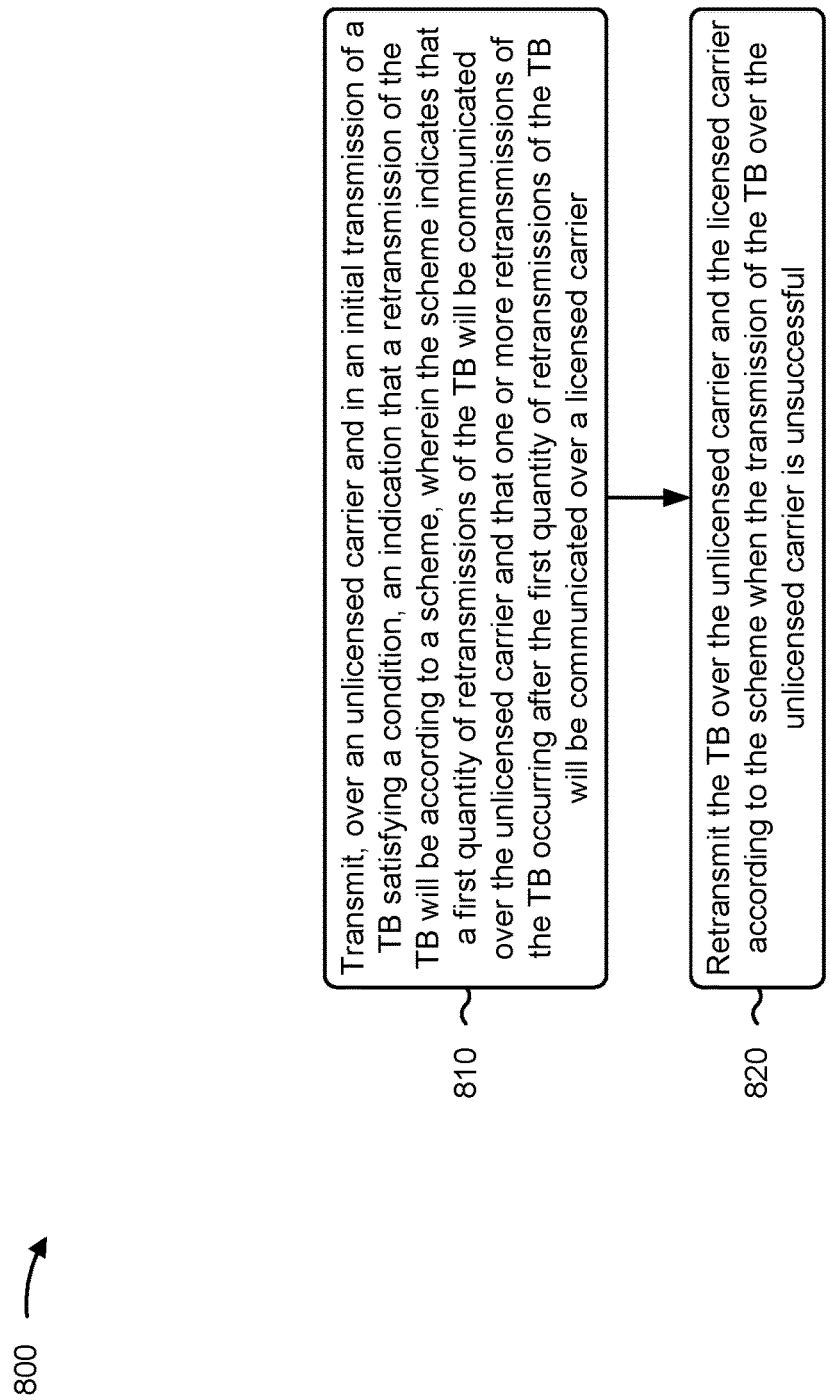

FIG. 8 is a diagram illustrating an example process 800 performed, for example, by an apparatus of a UE, in accordance with the present disclosure. Example process 800 is an example where the apparatus of the UE (e.g., UE 120) performs operations associated with unlicensed-licensed cross-carrier retransmission.

As shown in FIG. 8, in some aspects, process 800 may include transmitting, over an unlicensed carrier and in an initial transmission of a TB satisfying a condition, an indication that a retransmission of the TB will be according to a scheme, wherein the scheme indicates that a first quantity of retransmissions of the TB will be communicated over the unlicensed carrier and that one or more retransmissions of the TB occurring after the first quantity of retransmissions of the TB will be communicated over a licensed carrier (block 810). For example, the apparatus (e.g., using communication manager 140 and/or transmission component 1204, depicted in FIG. 12) may transmit, over an unlicensed carrier and in an initial transmission of a TB satisfying a condition, an indication that a retransmission of the TB will be according to a scheme, wherein the scheme indicates that a first quantity of retransmissions of the TB will be communicated over the unlicensed carrier and that one or more retransmissions of the TB occurring after the first quantity of retransmissions of the TB will be communicated over a licensed carrier, as described above. In some aspects, the scheme indicates that a first quantity of retransmissions of the TB will be communicated over the unlicensed carrier and that one or more retransmissions of the TB occurring after the first quantity of retransmissions of the TB will be communicated over a licensed carrier.

As further shown in FIG. 8, in some aspects, process 800 may include retransmitting the TB over the unlicensed carrier and the licensed carrier according to the scheme when the transmission of the TB over the unlicensed carrier is unsuccessful (block 820). For example, the apparatus (e.g., using communication manager 140 and/or transmission component 1204, depicted in FIG. 12) may retransmit the TB over the unlicensed carrier and the licensed carrier according to the scheme when the transmission of the TB over the unlicensed carrier is unsuccessful, as described above.

Process 800 may include additional aspects, such as any single aspect or any combination of aspects described below and/or in connection with one or more other processes described elsewhere herein.

In a first aspect, the first quantity of retransmissions of the TB are blind retransmissions.

In a second aspect, the first quantity of retransmissions of the TB are feedback-triggered retransmissions.

In a third aspect, a first retransmission of the TB is a blind retransmission and a second retransmission of the TB is a feedback-triggered retransmission.

In a fourth aspect, the retransmission of the TB occurring after the first quantity of retransmissions of the TB is a blind retransmission.

In a fifth aspect, a subsequent retransmission of the TB over the licensed carrier is a feedback-triggered retransmission.

In a sixth aspect, the retransmission of the TB occurring after the first quantity of retransmissions of the TB is a feedback-triggered retransmission.

In a seventh aspect, the first quantity is one or more of equaling to zero, preconfiguring by the UE, indicating by a network associated with the licensed carrier, determining by the UE during the transmission of the TB over the unlicensed carrier, based at least in part on a CBR associated with the licensed carrier, a CBR associated with the unlicensed carrier, an RSSI associated with the licensed carrier, a packet priority associated with the TB, a PDB associated with the TB, a packet reliability requirement associated with the TB, or an RSSI associated with the unlicensed carrier.

In an eighth aspect, a last retransmission of the first quantity of retransmissions of the TB indicates that the retransmission of the TB occurring after the first quantity of retransmissions of the TB will be communicated over the licensed carrier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
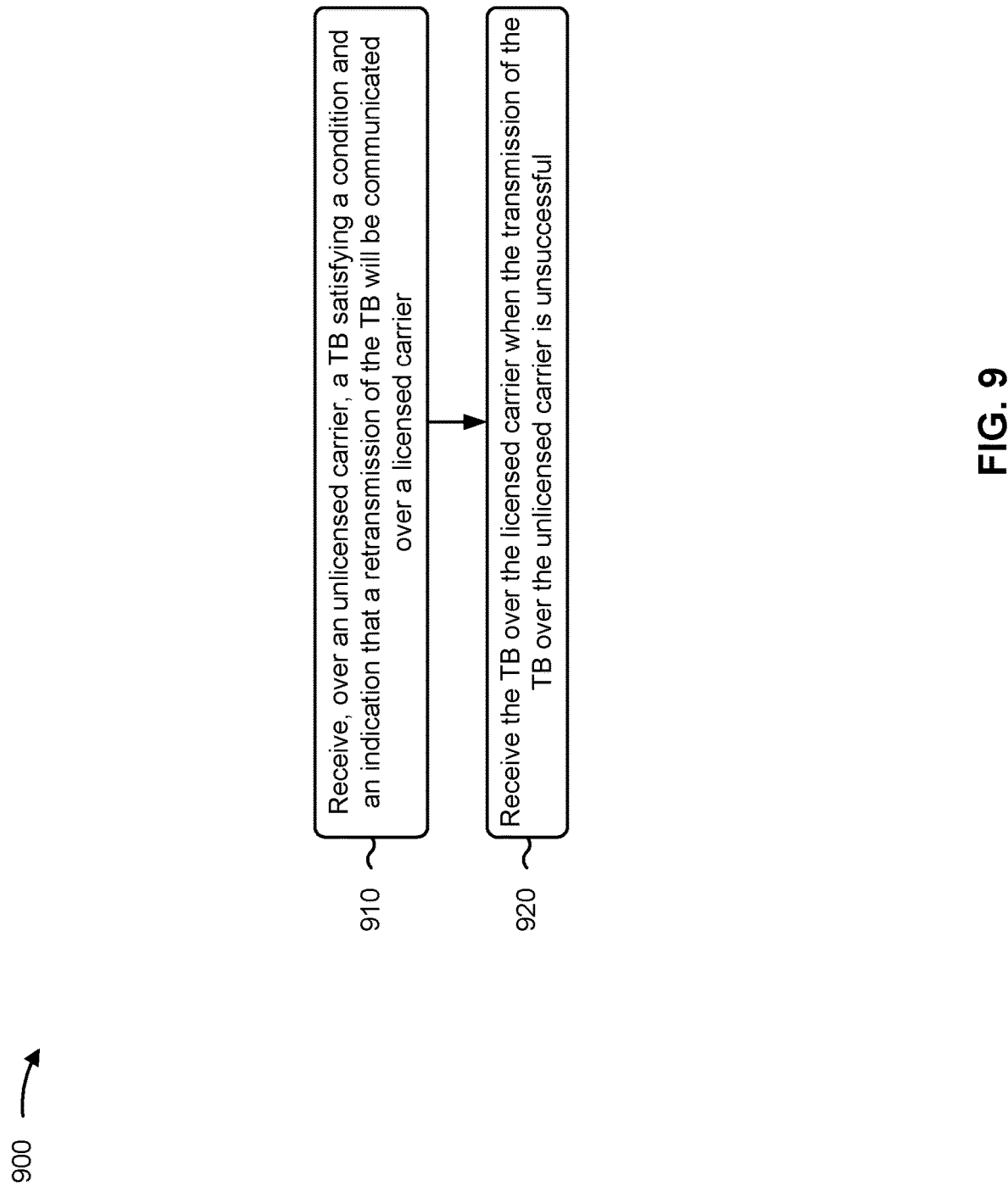

FIG. 9 is a diagram illustrating an example process 900 performed, for example, by an apparatus of a UE, in accordance with the present disclosure. Example process 900 is an example where the apparatus of the UE (e.g., UE 120) performs operations associated with unlicensed-licensed cross-carrier retransmission.

As shown in FIG. 9, in some aspects, process 900 may include receiving, over an unlicensed carrier, a TB satisfying a condition and an indication that a retransmission of the TB will be communicated over a licensed carrier (block 910). For example, the apparatus (e.g., using communication manager 140 and/or reception component 1302, depicted in FIG. 13) may receive, over an unlicensed carrier, a TB satisfying a condition and an indication that a retransmission of the TB will be communicated over a licensed carrier, as described above.

As further shown in FIG. 9, in some aspects, process 900 may include receiving the TB over the licensed carrier when the transmission of the TB over the unlicensed carrier is unsuccessful (block 920). For example, the apparatus (e.g., using communication manager 140 and/or reception component 1302, depicted in FIG. 13) may receive the TB over the licensed carrier when the transmission of the TB over the unlicensed carrier is unsuccessful, as described above.

Process 900 may include additional aspects, such as any single aspect or any combination of aspects described below and/or in connection with one or more other processes described elsewhere herein.

In a first aspect, the condition includes one or more of a priority associated with the TB satisfies a priority threshold, the TB is associated with a particular type of application, a PDB associated with the TB satisfies a PDB threshold, a first traffic load of the licensed carrier satisfies a first load threshold, a second traffic load of the unlicensed carrier satisfies a second load threshold, a quantity of unsuccessful transmissions over the unlicensed carrier satisfies a failure threshold, or a UE transmitting the TB receives an indication that the TB is to be transmitted over the unlicensed carrier.

In a second aspect, when receiving the TB over the licensed carrier when the transmission of the TB over the unlicensed carrier is unsuccessful, the method further comprises receiving information indicating a resource in the licensed carrier to be used for a subsequent retransmission of the TB.

In a third aspect, subsequent retransmissions of the TB over the licensed carrier include information indicating a respective resource in the licensed carrier to be used for a next retransmission of the TB.

In a fourth aspect, SCI associated with receiving the TB over the unlicensed carrier reserves a resource of the unlicensed carrier for the retransmission of the TB when the transmission of the TB over the unlicensed carrier is unsuccessful, the method further comprising mapping the resource of the unlicensed carrier to a resource of the licensed carrier, and receiving the TB via the resource of the licensed carrier when the transmission of the TB over the unlicensed carrier is unsuccessful.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
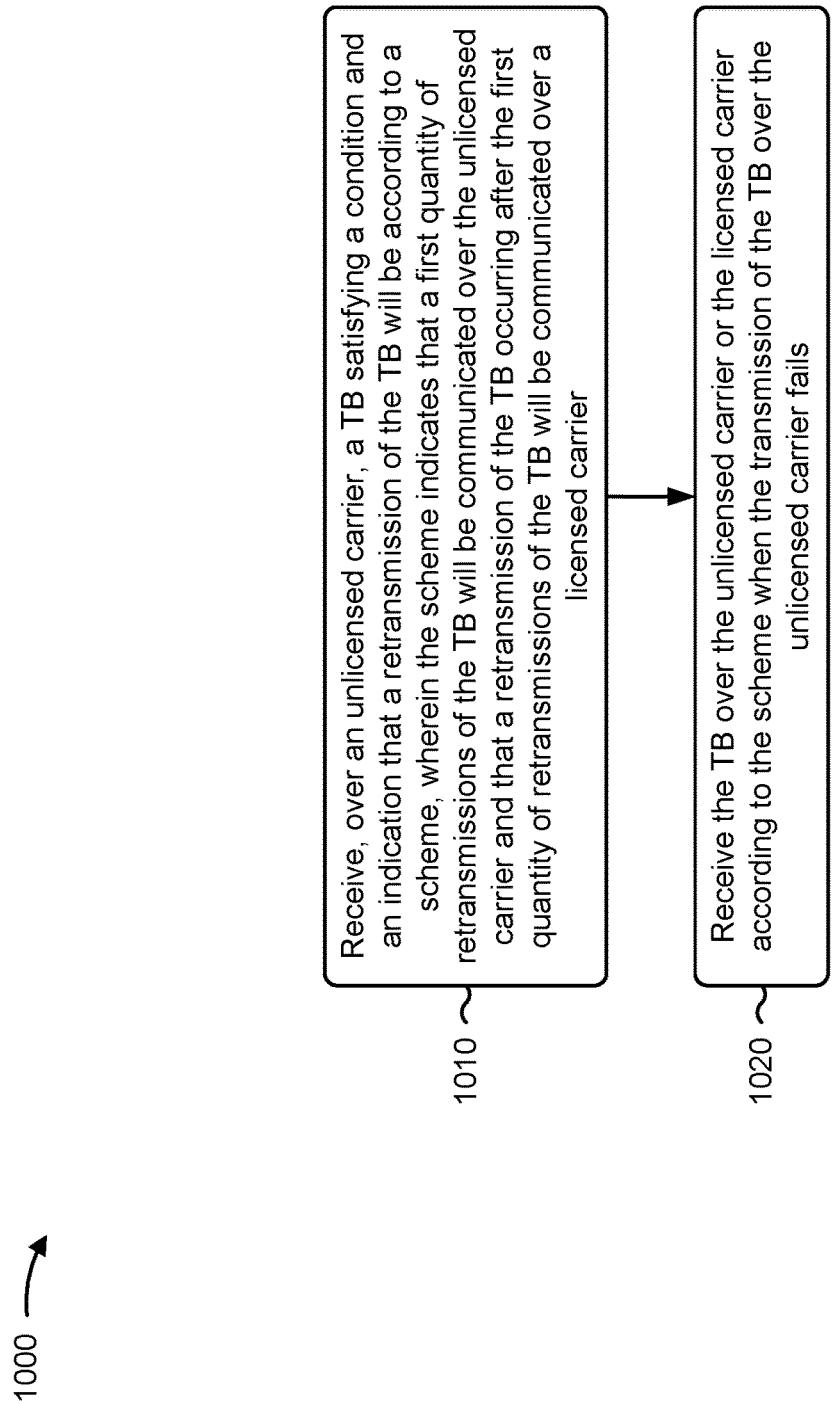

FIG. 10 is a diagram illustrating an example process 1000 performed, for example, by an apparatus of a UE, in accordance with the present disclosure. Example process 1000 is an example where the apparatus of a UE (e.g., UE 120) performs operations associated with unlicensed-licensed cross-carrier retransmission.

As shown in FIG. 10, in some aspects, process 1000 may include receiving, over an unlicensed carrier, a TB that satisfies a condition and an indication that a retransmission of the TB will be according to a scheme, wherein the scheme indicates that a first quantity of retransmissions of the TB will be communicated over the unlicensed carrier and that a retransmission of the TB occurring after the first quantity of retransmissions of the TB will be communicated over a licensed carrier (block 1010). For example, the apparatus (e.g., using communication manager 140 and/or reception component 1402, depicted in FIG. 14) may receive, over an unlicensed carrier, a TB that satisfies a condition and an indication that a retransmission of the TB will be according to a scheme, wherein the scheme indicates that a first quantity of retransmissions of the TB will be communicated over the unlicensed carrier and that a retransmission of the TB occurring after the first quantity of retransmissions of the TB will be communicated over a licensed carrier, as described above. In some aspects, the scheme indicates that a first quantity of retransmissions of the TB will be communicated over the unlicensed carrier and that a retransmission of the TB occurring after the first quantity of retransmissions of the TB will be communicated over a licensed carrier.

As further shown in FIG. 10, in some aspects, process 1000 may include receiving the TB over the unlicensed carrier or the licensed carrier according to the scheme when the transmission of the TB over the unlicensed carrier is unsuccessful (block 1020). For example, the apparatus (e.g., using communication manager 140 and/or reception component 1402, depicted in FIG. 14) may receive the TB over the unlicensed carrier or the licensed carrier according to the scheme when the transmission of the TB over the unlicensed carrier is unsuccessful, as described above.

Process 1000 may include additional aspects, such as any single aspect or any combination of aspects described below and/or in connection with one or more other processes described elsewhere herein.

In a first aspect, the first quantity is one or more of equal to zero, preconfigured by the UE, indicated by a network associated with the licensed carrier, based at least in part on a CBR associated with the licensed carrier, based at least in part on a CBR associated with the unlicensed carrier, based at least in part on an RSSI associated with the licensed carrier, or based at least in part on a RSSI associated with the unlicensed carrier.

In a second aspect, a last retransmission of the first quantity of retransmissions of the TB indicates that the retransmission of the TB occurring after the first quantity of retransmissions of the TB will be communicated over the licensed carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
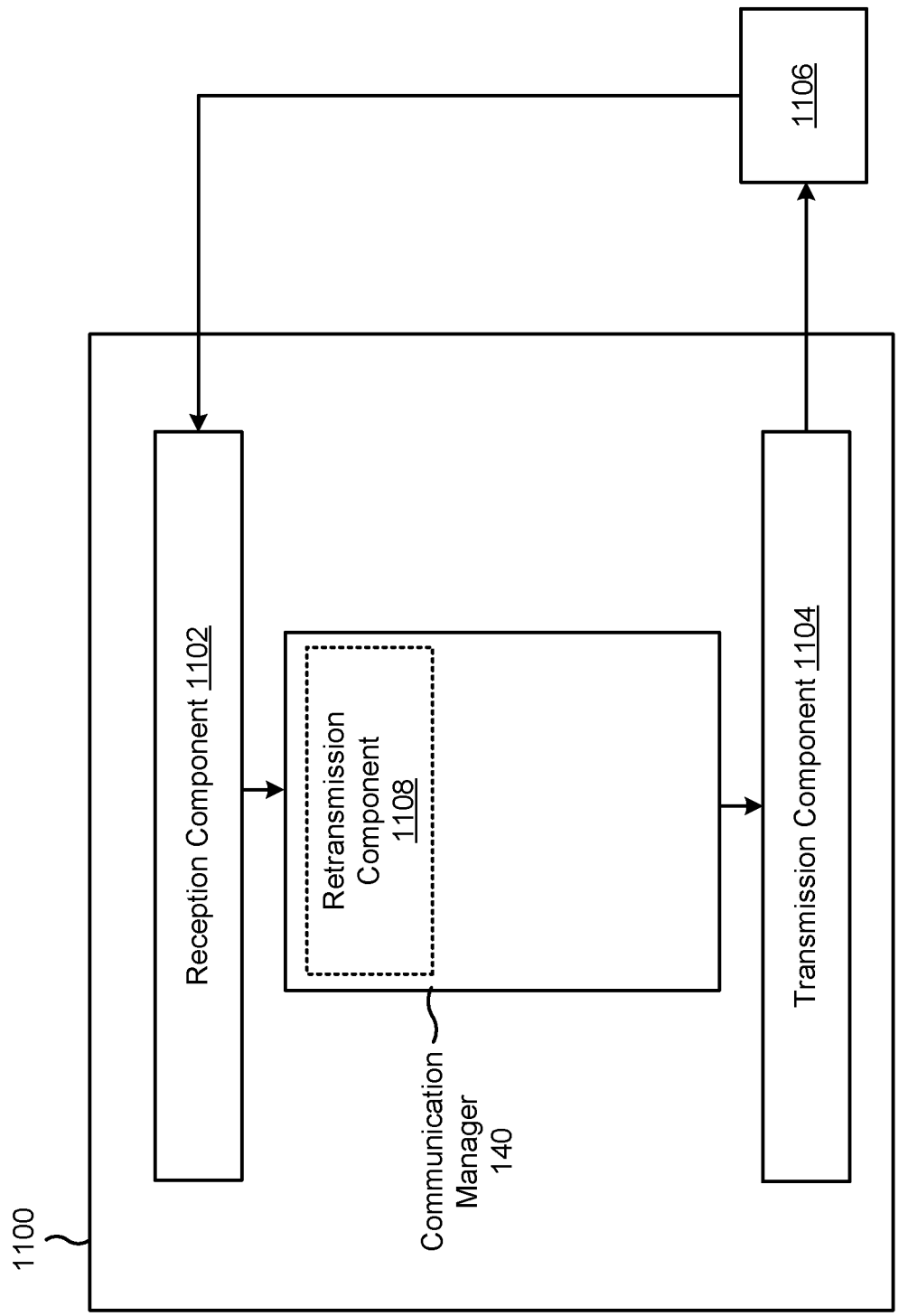
FIGS. 11-14 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a retransmission component 1108, among other examples.

In some aspects, the apparatus 1100 may be configured to perform one or more operations described herein in connection with FIG. 6. Additionally, or alternatively, the apparatus 1100 may be configured to perform one or more processes described herein, such as process 7 of FIG. 7. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, over an unlicensed carrier and in an initial transmission of a TB satisfying a condition, an indication that a retransmission of the TB will be communicated over a licensed carrier. The transmission component 1104 may retransmit the TB over the licensed carrier when the transmission of the TB over the unlicensed carrier is unsuccessful.

The transmission component 1104 may transmit information indicating a resource in the licensed carrier to be used for a subsequent retransmission of the TB.

The retransmission component 1108 may cause the TB to be retransmitted over a non-reserved resource of the licensed carrier based at least in part on the transmission of the TB over the unlicensed carrier being unsuccessful.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
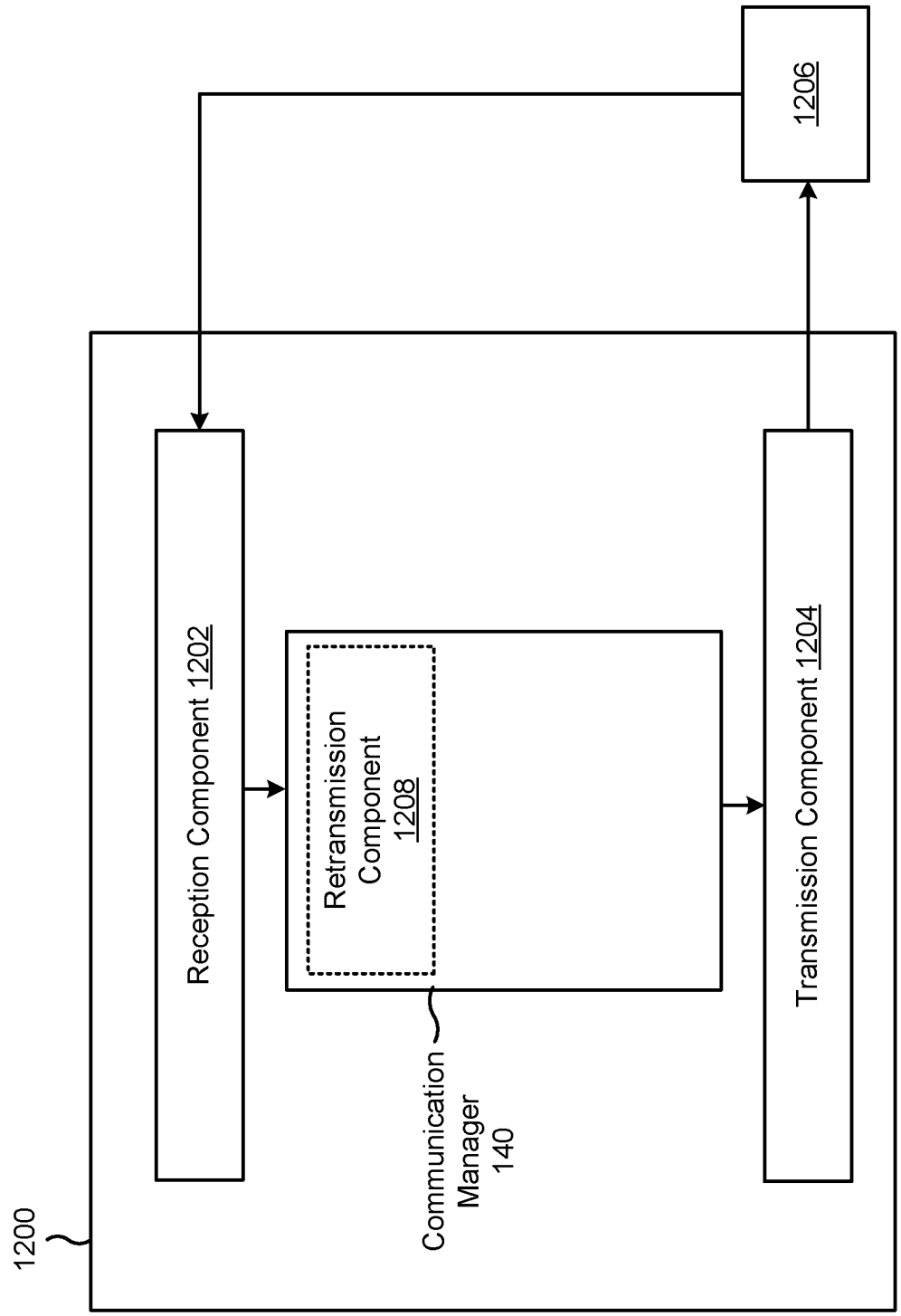

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a retransmission component 1208, among other examples.

In some aspects, the apparatus 1200 may be configured to perform one or more operations described herein in connection with FIG. 6. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The transmission component 1204 may transmit, over an unlicensed carrier and in an initial transmission of a TB satisfying a condition, an indication that a retransmission of the TB will be according to a scheme wherein the scheme indicates that a first quantity of retransmissions of the TB will be communicated over the unlicensed carrier and that one or more retransmissions of the TB occurring after the first quantity of retransmissions of the TB will be communicated over a licensed carrier. The transmission component 1204 may retransmit the TB over the unlicensed carrier and the licensed carrier according to the scheme when the transmission of the TB over the unlicensed carrier is unsuccessful.

The retransmission component 1208 may cause the TB to be retransmitted according to a carrier selection scheme (e.g., over a resource of the licensed carrier or the unlicensed carrier) based at least in part on the transmission of the TB over the unlicensed carrier being unsuccessful.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
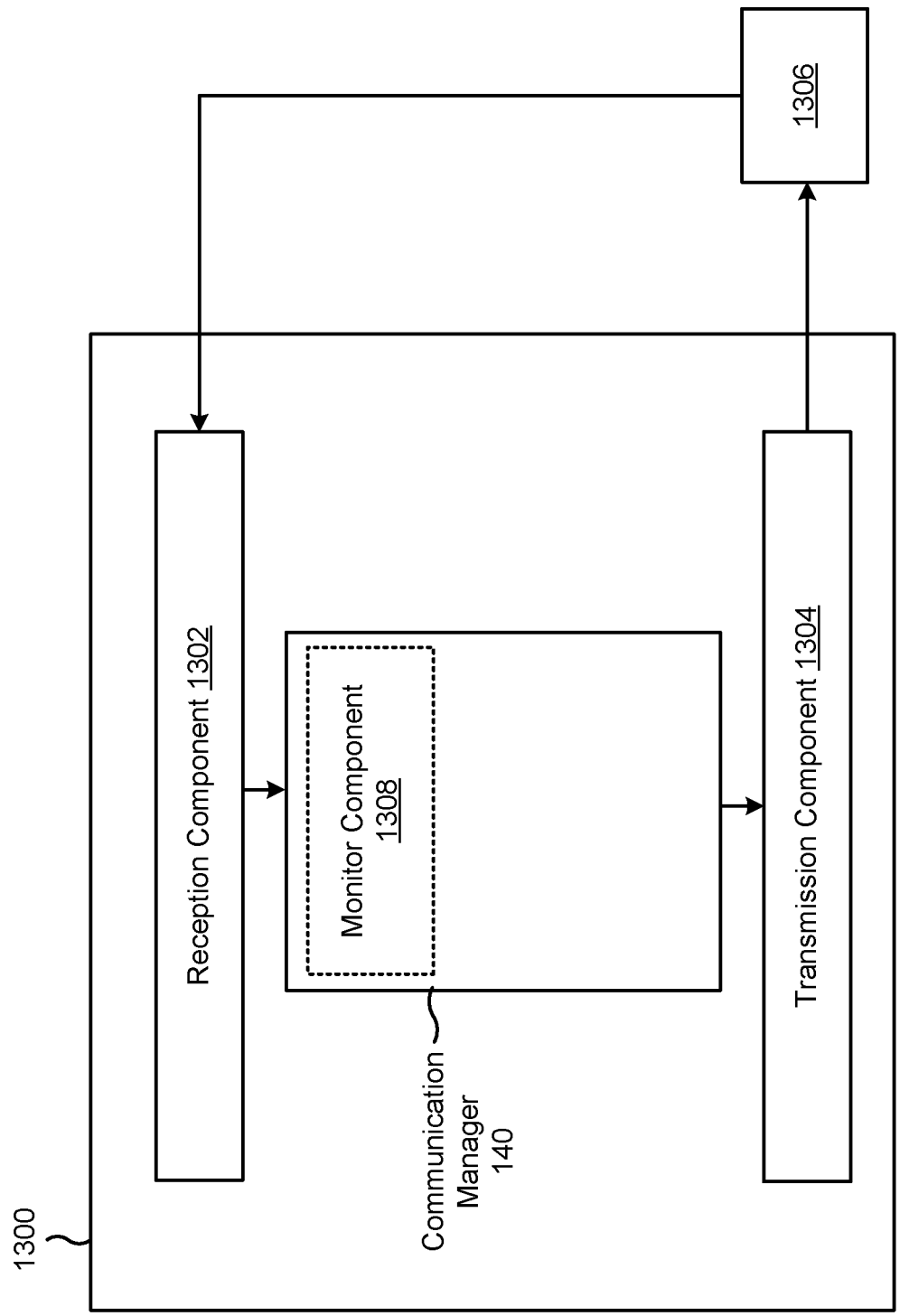

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a monitor component 1308, among other examples.

In some aspects, the apparatus 1300 may be configured to perform one or more operations described herein in connection with FIG. 6. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, over an unlicensed carrier, a TB satisfying a condition and an indication that a retransmission of the TB will be communicated over a licensed carrier. The reception component 1302 may receive the TB over the licensed carrier when the transmission of the TB over the unlicensed carrier is unsuccessful.

The monitor component 1308 may monitor one or more resources of the licensed carrier to receive the retransmission of the TB when the transmission of the TB over the unlicensed carrier is unsuccessful.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
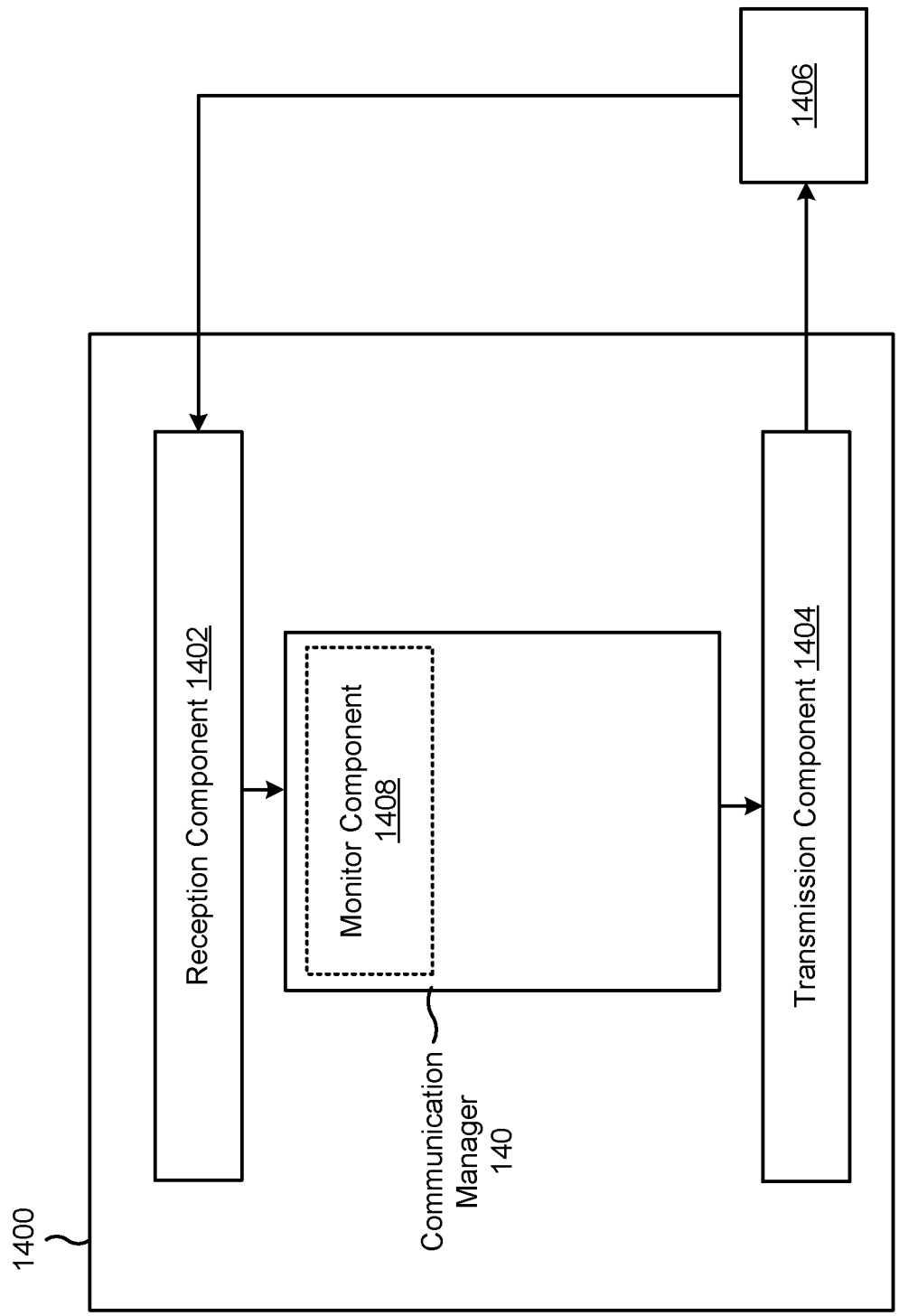

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a monitor component 1408, among other examples.

In some aspects, the apparatus 1400 may be configured to perform one or more operations described herein in connection with FIG. 6. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive, over an unlicensed carrier, a TB that satisfies a condition and an indication that a retransmission of the TB will be according to a scheme wherein the scheme indicates that a first quantity of retransmissions of the TB will be communicated over the unlicensed carrier and that a retransmission of the TB occurring after the first quantity of retransmissions of the TB will be communicated over a licensed carrier. The reception component 1402 may receive the TB over the unlicensed carrier or the licensed carrier according to the scheme when the transmission of the TB over the unlicensed carrier is unsuccessful.

The monitor component 1408 may monitor one or more resources of the licensed carrier or the unlicensed carrier according to a carrier selection scheme to receive the retransmission of the TB when the transmission of the TB over the unlicensed carrier is unsuccessful.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an apparatus of a UE, comprising: transmitting, over an unlicensed carrier and in an initial transmission of a TB satisfying a condition, an indication that a retransmission of the TB will be communicated over a licensed carrier; and retransmitting the TB over the licensed carrier when the transmission of the TB over the unlicensed carrier is unsuccessful.

Aspect 2: The method of Aspect 1, wherein the TB is transmitted over the unlicensed carrier based at least in part on the TB corresponding to a high reliability service.

Aspect 3: The method of one or more of Aspects 1 and 2, wherein the condition includes one or more of: a priority associated with the TB satisfies a priority threshold, the TB is associated with a particular type of application, a PDB associated with the TB satisfies a PDB threshold, a first traffic load of the licensed carrier satisfies a first load threshold, a second traffic load of the unlicensed carrier satisfies a second load threshold, a quantity of unsuccessful transmissions over the unlicensed carrier satisfies a failure threshold, or the UE receives an indication that the TB is to be transmitted over the unlicensed carrier.

Aspect 4: The method of one or more of Aspects 1 through 3, wherein the TB is retransmitted over the licensed carrier based at least in part on the high reliability service being identified as a service for which TBs associated with the service are to be retransmitted over the licensed carrier.

Aspect 5: The method of one or more of Aspects 1 through 4, wherein all retransmissions of TBs transmitted over the unlicensed carrier are retransmitted over the licensed carrier.

Aspect 6: The method of Aspect 5, wherein the TBs transmitted over the unlicensed carrier are retransmitted over the licensed carrier according to a specific pattern.

Aspect 7: The method of one or more of Aspects 1 through 6, further comprising: transmitting information indicating a resource in the licensed carrier to be used for a subsequent retransmission of the TB.

Aspect 8: The method of one or more of Aspects 1 through 7, wherein the indication comprises a single bit.

Aspect 9: The method of one or more of Aspects 1 through 8, wherein the TB is retransmitted over a non-reserved resource of the licensed carrier based at least in part on the transmission of the TB over the unlicensed carrier being unsuccessful.

Aspect 10: The method of one or more of Aspects 1 through 9, wherein SCI associated with transmitting the TB over the unlicensed carrier reserves a resource of the unlicensed carrier for the retransmission of the TB, wherein the resource of the unlicensed carrier is mapped to a resource of the licensed carrier, and wherein the TB is retransmitted over the resource of the licensed carrier based at least in part on the resource of the unlicensed carrier being mapped to the resource of the licensed carrier.

Aspect 11: The method of one or more of Aspects 1 through 10, wherein the transmission of the TB over the unlicensed carrier is unsuccessful based at least in part on a quantity of LBT failures, the method further comprises: transmitting the TB over the licensed carrier.

Aspect 12: The method of Aspect 11, wherein the TB is transmitted over the licensed carrier based at least in part on the quantity of LBT failures satisfying a threshold.

Aspect 13: The method of Aspect 11, wherein the TB is transmitted over the licensed carrier based at least in part on a remaining PDB satisfying a threshold.

Aspect 14: A method of wireless communication performed by an apparatus of a UE, comprising: transmitting, over an unlicensed carrier and in an initial transmission of a TB satisfying a condition, an indication that a retransmission of the TB will be according to a scheme, wherein the scheme indicates that a first quantity of retransmissions of the TB will be communicated over the unlicensed carrier and that one or more retransmissions of the TB occurring after the first quantity of retransmissions of the TB will be communicated over a licensed carrier; and retransmitting the TB over the unlicensed carrier and the licensed carrier according to the scheme when the transmission of the TB over the unlicensed carrier is unsuccessful.

Aspect 15: The method of Aspect 14, wherein the first quantity of retransmissions of the TB are blind retransmissions.

Aspect 16: The method of one or more of Aspects 14 and 15, wherein the first quantity of retransmissions of the TB are feedback-triggered retransmissions.

Aspect 17: The method of one or more of Aspects 14 through 16, wherein a first retransmission of the TB is a blind retransmission and a second retransmission of the TB is a feedback-triggered retransmission.

Aspect 18: The method of one or more of Aspects 14 through 17, wherein the retransmission of the TB occurring after the first quantity of retransmissions of the TB is a blind retransmission.

Aspect 19: The method of Aspect 18, wherein a subsequent retransmission of the TB over the licensed carrier is a feedback-triggered retransmission.

Aspect 20: The method of one or more of Aspects 14 through 19, wherein the retransmission of the TB occurring after the first quantity of retransmissions of the TB is a feedback-triggered retransmission.

Aspect 21: The method of one or more of Aspects 14 through 20, wherein the first quantity is one or more of: equal to zero, preconfigured by the UE, indicated by a network associated with the licensed carrier, determined by the UE during the transmission of the TB over the unlicensed carrier, based at least in part on a CBR associated with the licensed carrier, based at least in part on a CBR associated with the unlicensed carrier, based at least in part on an RSSI associated with the licensed carrier, a packet priority associated with the TB, a PDB associated with the TB, a packet reliability requirement associated with the TB, or based at least in part on a RSSI associated with the unlicensed carrier.

Aspect 22: The method of one or more of Aspects 14 through 21, wherein a last retransmission of the first quantity of retransmissions of the TB indicates that the retransmission of the TB occurring after the first quantity of retransmissions of the TB will be communicated over the licensed carrier.

Aspect 23: A method of wireless communication performed by an apparatus of a UE, comprising: receiving, over an unlicensed carrier, a TB satisfying a condition and an indication that a retransmission of the TB will be communicated over a licensed carrier; and receiving the TB over the licensed carrier when the transmission of the TB over the unlicensed carrier is unsuccessful.

Aspect 24: The method of Aspect 23, wherein the condition includes one or more of: a priority associated with the TB satisfies a priority threshold, the TB is associated with a particular type of application, a PDB associated with the TB satisfies a PDB threshold, a first traffic load of the licensed carrier satisfies a first load threshold, a second traffic load of the unlicensed carrier satisfies a second load threshold, a quantity of unsuccessful transmissions over the unlicensed carrier satisfies a failure threshold, or a UE transmitting the TB receives an indication that the TB is to be transmitted over the unlicensed carrier.

Aspect 25: The method of one or more of Aspects 23 and 24, wherein when receiving the TB over the licensed carrier when the transmission of the TB over the unlicensed carrier is unsuccessful, the method further comprises: receiving information indicating a resource in the licensed carrier to be used for a subsequent retransmission of the TB.

Aspect 26: The method of one or more of Aspects 23 through 25, wherein subsequent retransmissions of the TB over the licensed carrier include information indicating a respective resource in the licensed carrier to be used for a next retransmission of the TB.

Aspect 27: The method of one or more of Aspects 23 through 25, wherein SCI associated with receiving the TB over the unlicensed carrier reserves a resource of the unlicensed carrier for the retransmission of the TB when the transmission of the TB over the unlicensed carrier is unsuccessful, the method further comprising: mapping the resource of the unlicensed carrier to a resource of the licensed carrier; and receiving the TB via the resource of the licensed carrier when the transmission of the TB over the unlicensed carrier is unsuccessful.

Aspect 28: A method of wireless communication performed by an apparatus of a UE, comprising: receiving, over an unlicensed carrier, a TB that satisfies a condition and an indication that a retransmission of the TB will be according to a scheme, wherein the scheme indicates that a first quantity of retransmissions of the TB will be communicated over the unlicensed carrier and that a retransmission of the TB occurring after the first quantity of retransmissions of the TB will be communicated over a licensed carrier; and receiving the TB over the unlicensed carrier or the licensed carrier according to the scheme when the transmission of the TB over the unlicensed carrier is unsuccessful.

Aspect 29: The method of Aspect 28, wherein the first quantity is one or more of: equal to zero, preconfigured by the UE, indicated by a network associated with the licensed carrier, based at least in part on a CBR associated with the licensed carrier, based at least in part on a CBR associated with the unlicensed carrier, based at least in part on an RSSI associated with the licensed carrier, or based at least in part on an RSSI associated with the unlicensed carrier.

Aspect 30: The method of one or more of Aspects 28 and 29, wherein a last retransmission of the first quantity of retransmissions of the TB indicates that the retransmission of the TB occurring after the first quantity of retransmissions of the TB will be communicated over the licensed carrier.

Aspect 31: An apparatus for wireless communication at a device, comprising a processor; memory coupled with the processor; and instructions stored in the memory and executable by the processor to cause the apparatus to perform the method of one or more of Aspects 1 through 13.

Aspect 32: A device for wireless communication, comprising a memory and one or more processors coupled to the memory, the one or more processors configured to perform the method of one or more of Aspects 1 through 13.

Aspect 33: An apparatus for wireless communication, comprising at least one means for performing the method of one or more of Aspects 1 through 13.

Aspect 34: A non-transitory computer-readable medium storing code for wireless communication, the code comprising instructions executable by a processor to perform the method of one or more of Aspects 1 through 13.

Aspect 35: A non-transitory computer-readable medium storing a set of instructions for wireless communication, the set of instructions comprising one or more instructions that, when executed by one or more processors of a device, cause the device to perform the method of one or more of Aspects 1 through 13.

Aspect 36: An apparatus for wireless communication at a device, comprising a processor; memory coupled with the processor; and instructions stored in the memory and executable by the processor to cause the apparatus to perform the method of one or more of Aspects 14 through 22.

Aspect 37: A device for wireless communication, comprising a memory and one or more processors coupled to the memory, the one or more processors configured to perform the method of one or more of Aspects 14 through 22.

Aspect 38: An apparatus for wireless communication, comprising at least one means for performing the method of one or more of Aspects 14 through 22.

Aspect 39: A non-transitory computer-readable medium storing code for wireless communication, the code comprising instructions executable by a processor to perform the method of one or more of Aspects 14 through 22.

Aspect 40: A non-transitory computer-readable medium storing a set of instructions for wireless communication, the set of instructions comprising one or more instructions that, when executed by one or more processors of a device, cause the device to perform the method of one or more of Aspects 14 through 22.

Aspect 41: An apparatus for wireless communication at a device, comprising a processor; memory coupled with the processor; and instructions stored in the memory and executable by the processor to cause the apparatus to perform the method of one or more of Aspects 23 through 27.

Aspect 42: A device for wireless communication, comprising a memory and one or more processors coupled to the memory, the one or more processors configured to perform the method of one or more of Aspects 23 through 27.

Aspect 43: An apparatus for wireless communication, comprising at least one means for performing the method of one or more of Aspects 23 through 27.

Aspect 44: A non-transitory computer-readable medium storing code for wireless communication, the code comprising instructions executable by a processor to perform the method of one or more of Aspects 23 through 27.

Aspect 45: A non-transitory computer-readable medium storing a set of instructions for wireless communication, the set of instructions comprising one or more instructions that, when executed by one or more processors of a device, cause the device to perform the method of one or more of Aspects 23 through 27.

Aspect 46: An apparatus for wireless communication at a device, comprising a processor; memory coupled with the processor; and instructions stored in the memory and executable by the processor to cause the apparatus to perform the method of one or more of Aspects 28 through 30.

Aspect 47: A device for wireless communication, comprising a memory and one or more processors coupled to the memory, the one or more processors configured to perform the method of one or more of Aspects 28 through 30.

Aspect 48: An apparatus for wireless communication, comprising at least one means for performing the method of one or more of Aspects 28 through 30.

Aspect 49: A non-transitory computer-readable medium storing code for wireless communication, the code comprising instructions executable by a processor to perform the method of one or more of Aspects 28 through 30.

Aspect 50: A non-transitory computer-readable medium storing a set of instructions for wireless communication, the set of instructions comprising one or more instructions that, when executed by one or more processors of a device, cause the device to perform the method of one or more of Aspects 28 through 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
   a memory; and
   one or more processors, coupled to the memory, configured to:
      transmit, over an unlicensed carrier and in an initial transmission of a transport block (TB) satisfying a condition, an indication that a retransmission of the TB will be communicated over a licensed carrier, wherein sidelink control information (SCI) associated with transmitting the TB over the unlicensed carrier indicates a reservation of a resource of the unlicensed carrier for the retransmission of the TB, wherein the resource of the unlicensed carrier is mapped to a resource of the licensed; and
      retransmit the TB over the licensed carrier when the initial transmission of the TB over the unlicensed carrier is unsuccessful, wherein the TB is retransmitted over the resource of the licensed carrier based at least in part on the resource of the unlicensed carrier being mapped to the resource of the licensed carrier.

2. The apparatus of claim 1, wherein the TB is transmitted over the unlicensed carrier based at least in part on the TB corresponding to a high reliability service.

3. The apparatus of claim 1, wherein the condition includes one or more of:
   a priority associated with the TB satisfies a priority threshold,
   the TB is associated with a particular type of application,
   a packet delay budget (PDB) associated with the TB satisfies a PDB threshold,
   a first traffic load of the licensed carrier satisfies a first load threshold,
   a second traffic load of the unlicensed carrier satisfies a second load threshold,
   a quantity of unsuccessful transmissions over the unlicensed carrier satisfies a failure threshold, or
   the UE receives an indication that the TB is to be transmitted over the unlicensed carrier.

4. The apparatus of claim 1, wherein the TB is retransmitted over the licensed carrier based at least in part on the TB being associated with a high reliability service and the high reliability service being identified as a service for which TBs associated with the service are to be retransmitted over the licensed carrier.

5. The apparatus of claim 1, wherein all retransmissions of TBs transmitted over the unlicensed carrier are retransmitted over the licensed carrier.

6. The apparatus of claim 5, wherein the TBs transmitted over the unlicensed carrier are retransmitted over the licensed carrier according to a specific pattern.

7. The apparatus of claim 1, wherein the indication comprises a single bit.

8. The apparatus of claim 1, wherein the resource of the unlicensed carrier is mapped to the resource of the licensed carrier based at least in part on a pre-configured mapping.

9. The apparatus of claim 1, wherein the initial transmission of the TB over the unlicensed carrier is unsuccessful based at least in part on a quantity of listen-before-talk (LBT) failures, and wherein the one or more processors are further configured to:
   transmit the TB over the licensed carrier.

10. The apparatus of claim 9, wherein the TB is transmitted over the licensed carrier based at least in part on the quantity of LBT failures satisfying a threshold.

11. The apparatus of claim 9, wherein the TB is transmitted over the licensed carrier based at least in part on a remaining packet delay budget (PDB) satisfying a threshold.

12. An apparatus of a user equipment (UE) for wireless communication, comprising:
a memory; and
one or more processors, coupled to the memory, configured to:
transmit, over an unlicensed carrier and in an initial transmission of a transport block (TB) satisfying a condition, an indication that a retransmission of the TB will be according to a scheme,
wherein the scheme indicates that a first quantity of retransmissions of the TB will be communicated over the unlicensed carrier and that one or more retransmissions of the TB occurring after the first quantity of retransmissions of the TB will be communicated over a licensed carrier; and
retransmit the TB over the unlicensed carrier and the licensed carrier according to the scheme when the initial transmission of the TB over the unlicensed carrier is unsuccessful.

13. The apparatus of claim 12, wherein the first quantity of retransmissions of the TB are blind retransmissions.

14. The apparatus of claim 12, wherein the first quantity of retransmissions of the TB are feedback-triggered retransmissions.

15. The apparatus of claim 12, wherein a first retransmission of the TB is a blind retransmission and a second retransmission of the TB is a feedback-triggered retransmission.

16. The apparatus of claim 12, wherein the retransmission of the TB occurring after the first quantity of retransmissions of the TB is a blind retransmission.

17. The apparatus of claim 16, wherein a subsequent retransmission of the TB over the licensed carrier is a feedback-triggered retransmission.

18. The apparatus of claim 12, wherein the retransmission of the TB occurring after the first quantity of retransmissions of the TB is a feedback-triggered retransmission.

19. The apparatus of claim 12, wherein the first quantity is one or more of:
preconfigured by the UE,
indicated by a network associated with the licensed carrier,
determined by the UE during the initial transmission of the TB over the unlicensed carrier,
based at least in part on a channel busy ratio (CBR) associated with the licensed carrier,
based at least in part on a CBR associated with the unlicensed carrier,
based at least in part on a received signal strength indicator (RSSI) associated with the licensed carrier,
a packet priority associated with the TB,
a packet delay budget (PDB) associated with the TB,
a packet reliability requirement associated with the TB, or
based at least in part on a RSSI associated with the unlicensed carrier.

20. An apparatus of a user equipment (UE) for wireless communication, comprising:
a memory; and
one or more processors, coupled to the memory, configured to:
receive, over an unlicensed carrier, a transport block (TB) satisfying a condition and an indication that a retransmission of the TB will be communicated over a licensed carrier, wherein sidelink control information (SCI) associated with receiving the TB over the unlicensed carrier indicates a reservation of a resource of the unlicensed carrier for the retransmission of the TB;
map the resource of the unlicensed carrier to a resource of the licensed carrier; and
receive the TB over the licensed carrier when a transmission of the TB over the unlicensed carrier is unsuccessful, wherein the TB is received over the resource of the licensed carrier based at least in part on the resource of the unlicensed carrier being mapped to the resource of the licensed carrier.

21. The apparatus of claim 20, wherein the condition includes one or more of:
a priority associated with the TB satisfies a priority threshold,
the TB is associated with a particular type of application,
a packet delay budget (PDB) associated with the TB satisfies a PDB threshold,
a first traffic load of the licensed carrier satisfies a first load threshold,
a second traffic load of the unlicensed carrier satisfies a second load threshold,
a quantity of unsuccessful transmissions over the unlicensed carrier satisfies a failure threshold, or
a UE transmitting the TB receives an indication that the TB is to be transmitted over the unlicensed carrier.

22. The apparatus of claim 20, wherein subsequent retransmissions of the TB over the licensed carrier include information indicating a respective resource in the licensed carrier to be used for a next retransmission of the TB.

23. The apparatus of claim 20, wherein the resource of the unlicensed carrier is mapped to the resource of the licensed carrier based at least in part on a pre-configured mapping.

24. An apparatus of a user equipment (UE) for wireless communication, comprising:
a memory; and
one or more processors, coupled to the memory, configured to:
receive, over an unlicensed carrier, a transport block (TB) that satisfies a condition and an indication that a retransmission of the TB will be according to a scheme,
wherein the scheme indicates that a first quantity of retransmissions of the TB will be communicated over the unlicensed carrier and that a retransmission of the TB occurring after the first quantity of retransmissions of the TB will be communicated over a licensed carrier; and
receive the TB over the unlicensed carrier or the licensed carrier according to the scheme when a transmission of the TB over the unlicensed carrier is unsuccessful.

25. The apparatus of claim 24, wherein the first quantity is one or more of:
preconfigured by the UE,
indicated by a network associated with the licensed carrier,
based at least in part on a channel busy ratio (CBR) associated with the licensed carrier,
based at least in part on a CBR associated with the unlicensed carrier,
based at least in part on a received signal strength indicator (RSSI) associated with the licensed carrier, or
based at least in part on a RSSI associated with the unlicensed carrier.

26. The apparatus of claim 24, wherein the retransmission of the TB occurring after the first quantity of retransmissions of the TB is a blind retransmission.

27. The apparatus of claim 26, wherein a subsequent retransmission of the TB over the licensed carrier is a feedback-triggered retransmission.

* * * * *